United States Patent
Dykes et al.

(10) Patent No.: US 9,280,768 B2
(45) Date of Patent: Mar. 8, 2016

(54) PAYMENT SYSTEMS AND METHODOLOGIES

(75) Inventors: Robert Dykes, San Jose, CA (US); Dan Loomis, San Jose, CA (US)

(73) Assignee: VERIFONE, INC., San Jose, CA (US)

( * ) Notice: Subject to any disclaimer, the term of this patent is extended or adjusted under 35 U.S.C. 154(b) by 834 days.

(21) Appl. No.: 13/006,137

(22) Filed: Jan. 13, 2011

(65) Prior Publication Data

US 2011/0231270 A1    Sep. 22, 2011

Related U.S. Application Data

(60) Provisional application No. 61/340,594, filed on Mar. 17, 2010.

(51) Int. Cl.

| G06Q 20/14 | (2012.01) |
|---|---|
| G06Q 20/32 | (2012.01) |
| G06Q 20/08 | (2012.01) |
| G06Q 20/04 | (2012.01) |
| G06Q 20/38 | (2012.01) |
| G06Q 20/10 | (2012.01) |
| G06Q 20/20 | (2012.01) |
| G06Q 20/22 | (2012.01) |
| G06Q 20/40 | (2012.01) |

(52) U.S. Cl.
CPC .............. *G06Q 20/32* (2013.01); *G06Q 20/045* (2013.01); *G06Q 20/0855* (2013.01); *G06Q 20/10* (2013.01); *G06Q 20/14* (2013.01); *G06Q 20/20* (2013.01); *G06Q 20/204* (2013.01); *G06Q 20/223* (2013.01); *G06Q 20/3274* (2013.01); *G06Q 20/3276* (2013.01); *G06Q 20/385* (2013.01); *G06Q 20/40* (2013.01)

(58) Field of Classification Search
USPC ...................................................... 705/18, 23
See application file for complete search history.

(56) References Cited

U.S. PATENT DOCUMENTS

| 3,971,065 | A | * | 7/1976 | Bayer ........................... 348/276 |
|---|---|---|---|---|
| 4,958,064 | A | * | 9/1990 | Kirkpatrick ................... 235/384 |
| 5,682,030 | A | * | 10/1997 | Kubon ..................... 235/462.25 |
| 6,082,620 | A | * | 7/2000 | Bone, Jr. .................. 235/462.16 |
| 6,726,094 | B1 | * | 4/2004 | Rantze et al. ................. 235/379 |
| 6,736,322 | B2 | | 5/2004 | Gobburu et al. |
| 6,997,384 | B2 | * | 2/2006 | Hara ............................. 235/454 |
| 7,032,823 | B2 | | 4/2006 | Nojiri |
| 7,210,631 | B2 | * | 5/2007 | Sali et al .................. 235/462.04 |

(Continued)

OTHER PUBLICATIONS definition of "pixel", See The American Heritage Science Dictionary (2002). Houghton Mifflin.*

*Primary Examiner* — Peter L Ludwig
(74) *Attorney, Agent, or Firm* — Sughrue Mion, PLLC

(57) ABSTRACT

A transaction system including at least two transaction communicators, at least one of which is a mobile communicator, at least one of the at least two transaction communicators having sequential visually sensible indicia generation functionality operative to generate a time sequence of indicia which provides at least transaction data and at least one of the at least two transaction communicators having sequential visually sensible indicia receiving functionality and transaction data extraction functionality capable of extracting at least the transaction data from the time sequence of particular indicia, whereby a time sequence of indicia which provides at least transaction data is transmitted from one of the at least two transaction communicators to another of the at least two transaction communicators.

15 Claims, 17 Drawing Sheets

(56) References Cited

U.S. PATENT DOCUMENTS

| | | | |
|---|---|---|---|
| 7,293,714 B2* | 11/2007 | Zhu et al. | 235/472.01 |
| 7,392,388 B2* | 6/2008 | Keech | 713/170 |
| 7,913,922 B1* | 3/2011 | Roth | 235/494 |
| 7,934,641 B2* | 5/2011 | Melick et al. | 235/375 |
| 8,186,593 B2* | 5/2012 | Morgana et al. | 235/462.04 |
| 8,231,054 B1* | 7/2012 | Kim | 235/437 |
| 2002/0101988 A1* | 8/2002 | Jones | 380/54 |
| 2002/0195495 A1* | 12/2002 | Melick et al. | 235/462.01 |
| 2004/0030659 A1 | 2/2004 | Gueh | |
| 2005/0203854 A1* | 9/2005 | Das et al. | 705/64 |
| 2005/0211771 A1* | 9/2005 | Onozu | 235/383 |
| 2005/0256806 A1 | 11/2005 | Tien et al. | |
| 2006/0054695 A1* | 3/2006 | Owada | 235/440 |
| 2006/0131385 A1 | 6/2006 | Kim | |
| 2006/0131390 A1 | 6/2006 | Kim | |
| 2006/0144946 A1* | 7/2006 | Kuriyama et al. | 235/462.1 |
| 2006/0293929 A1 | 12/2006 | Wu et al. | |
| 2007/0024879 A1* | 2/2007 | Hamilton et al. | 358/1.9 |
| 2007/0145273 A1* | 6/2007 | Chang | 250/338.1 |
| 2009/0084840 A1* | 4/2009 | Williams et al. | 235/379 |
| 2009/0281904 A1* | 11/2009 | Pharris | 705/17 |
| 2010/0030592 A1* | 2/2010 | Evans et al. | 705/5 |
| 2010/0138344 A1* | 6/2010 | Wong et al. | 705/44 |
| 2011/0000958 A1* | 1/2011 | Herzig | 235/375 |
| 2011/0068173 A1* | 3/2011 | Powers et al. | 235/462.06 |
| 2011/0079639 A1* | 4/2011 | Khan | 235/375 |

* cited by examiner

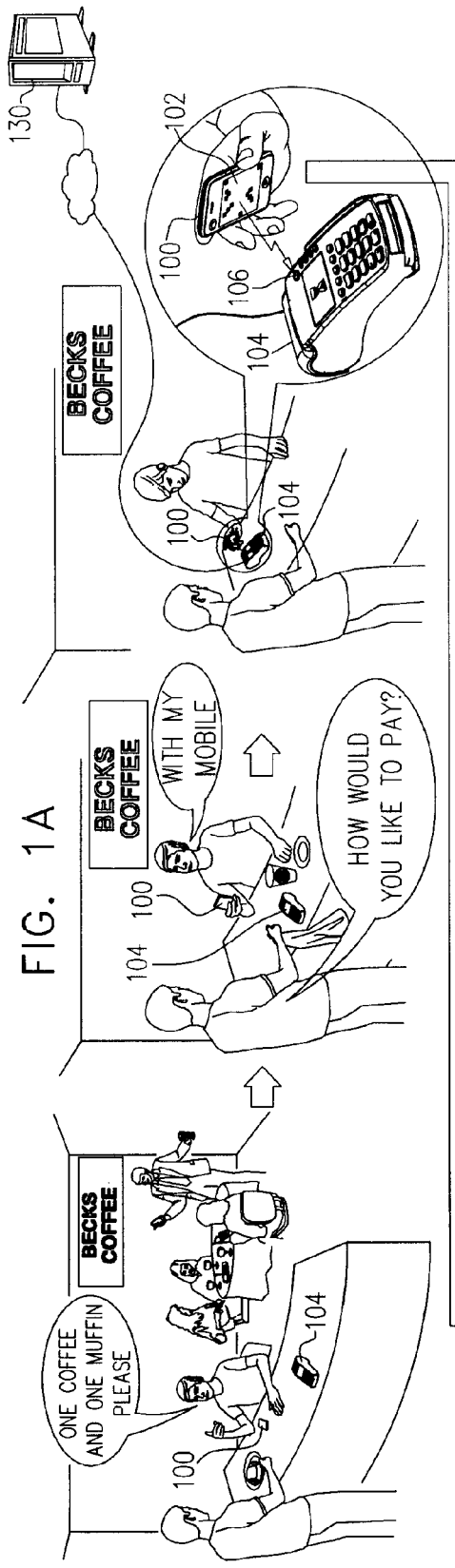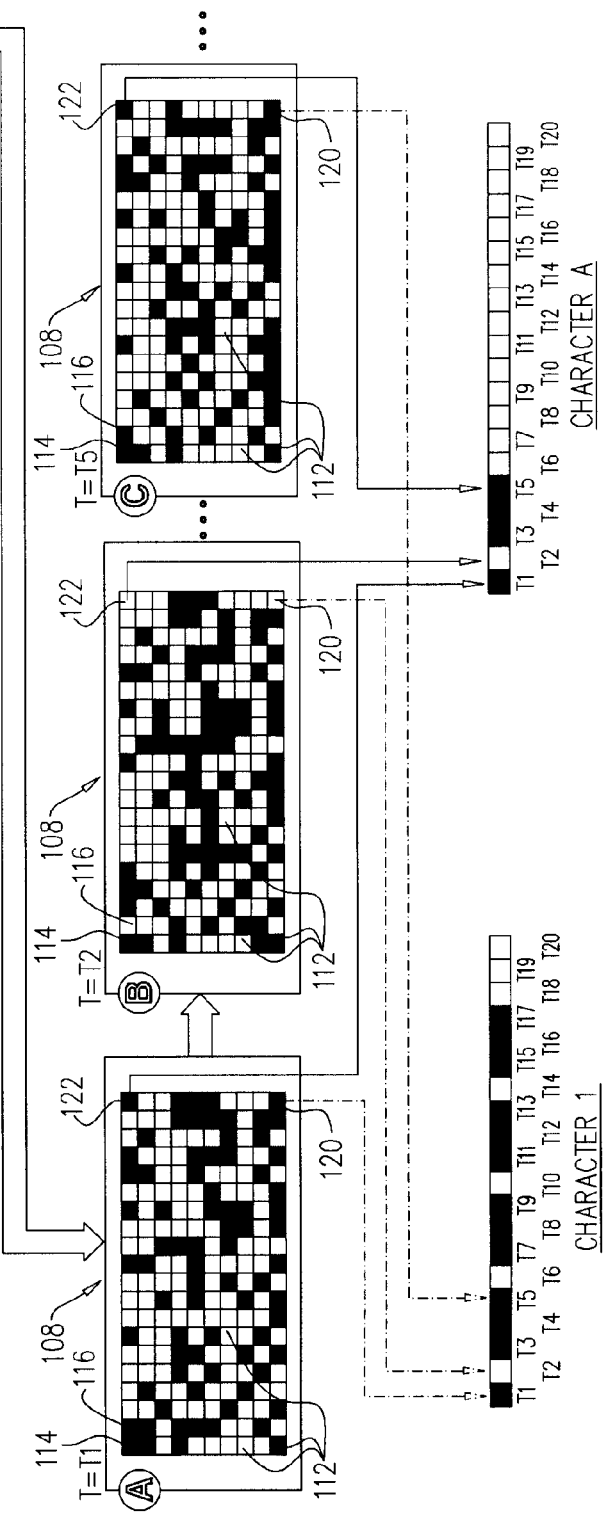
FIG. 1A

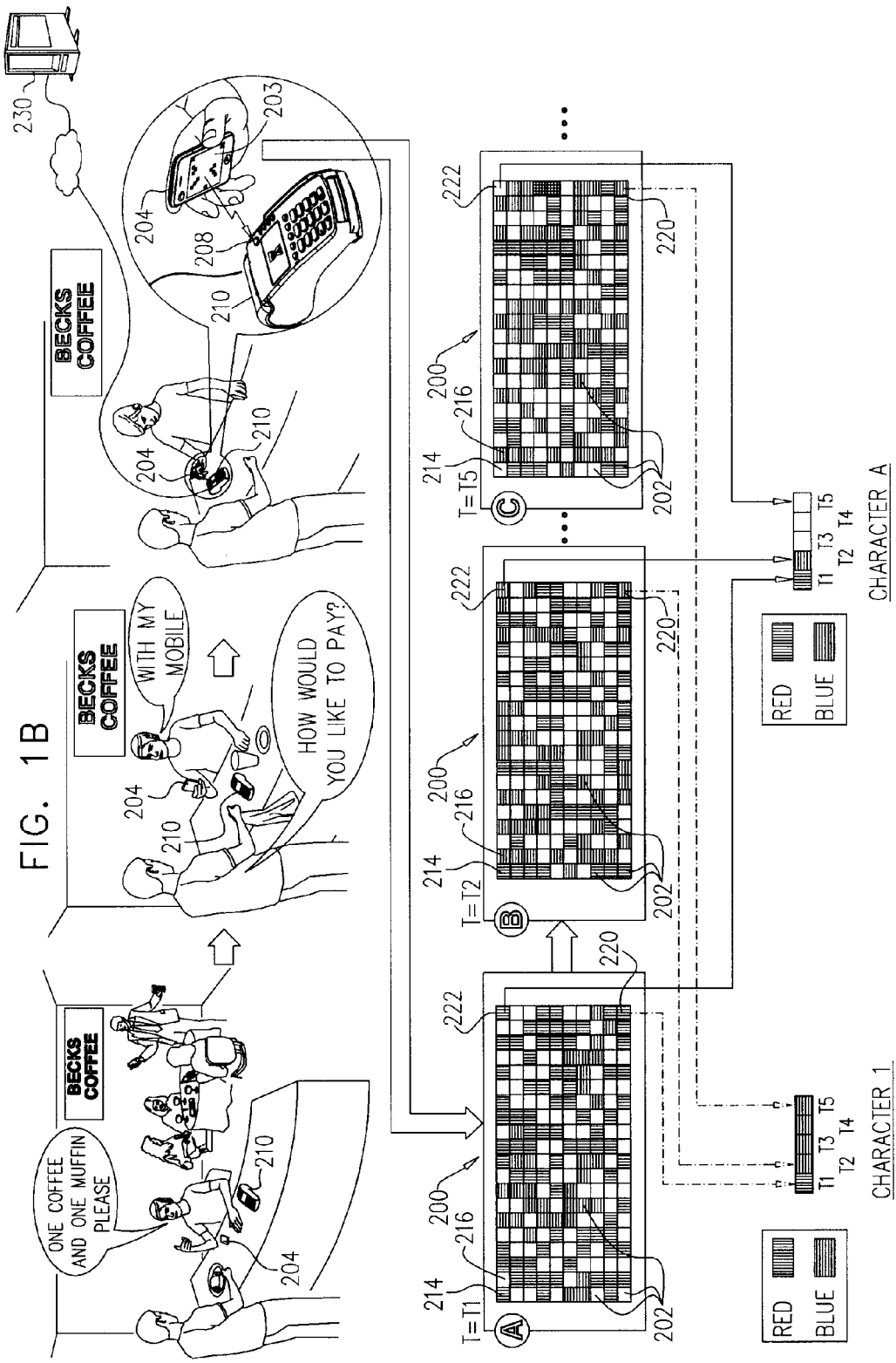

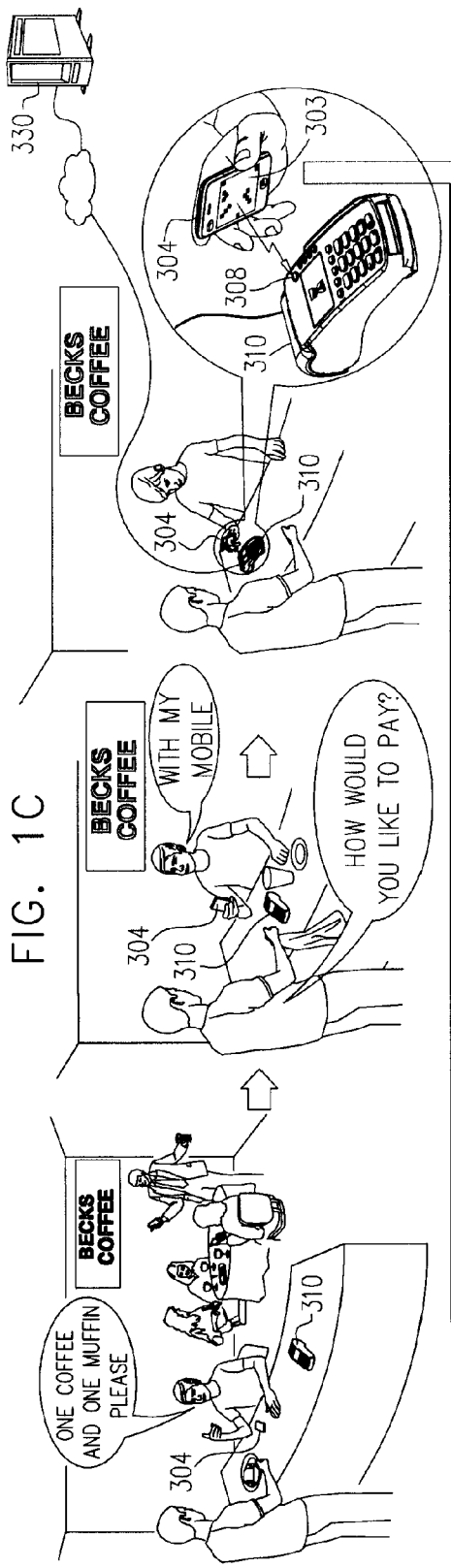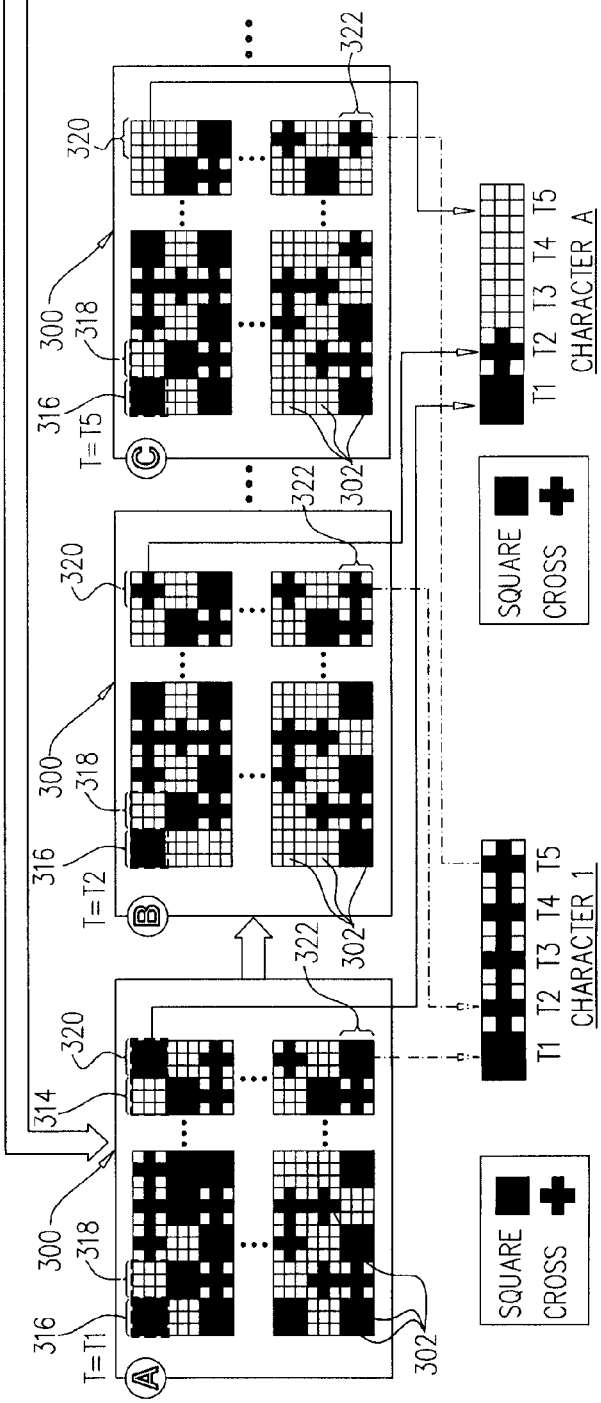
FIG. 1C

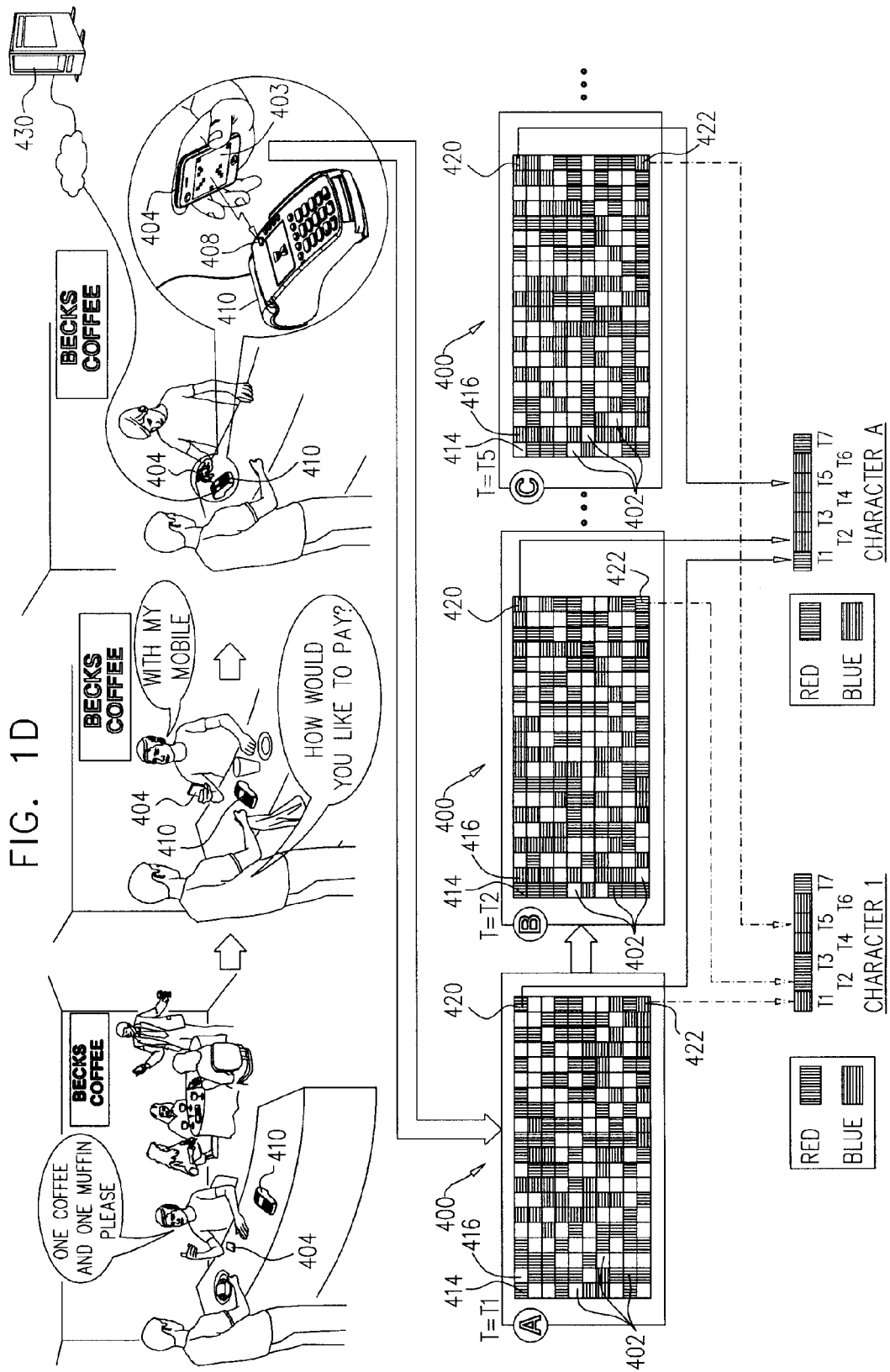

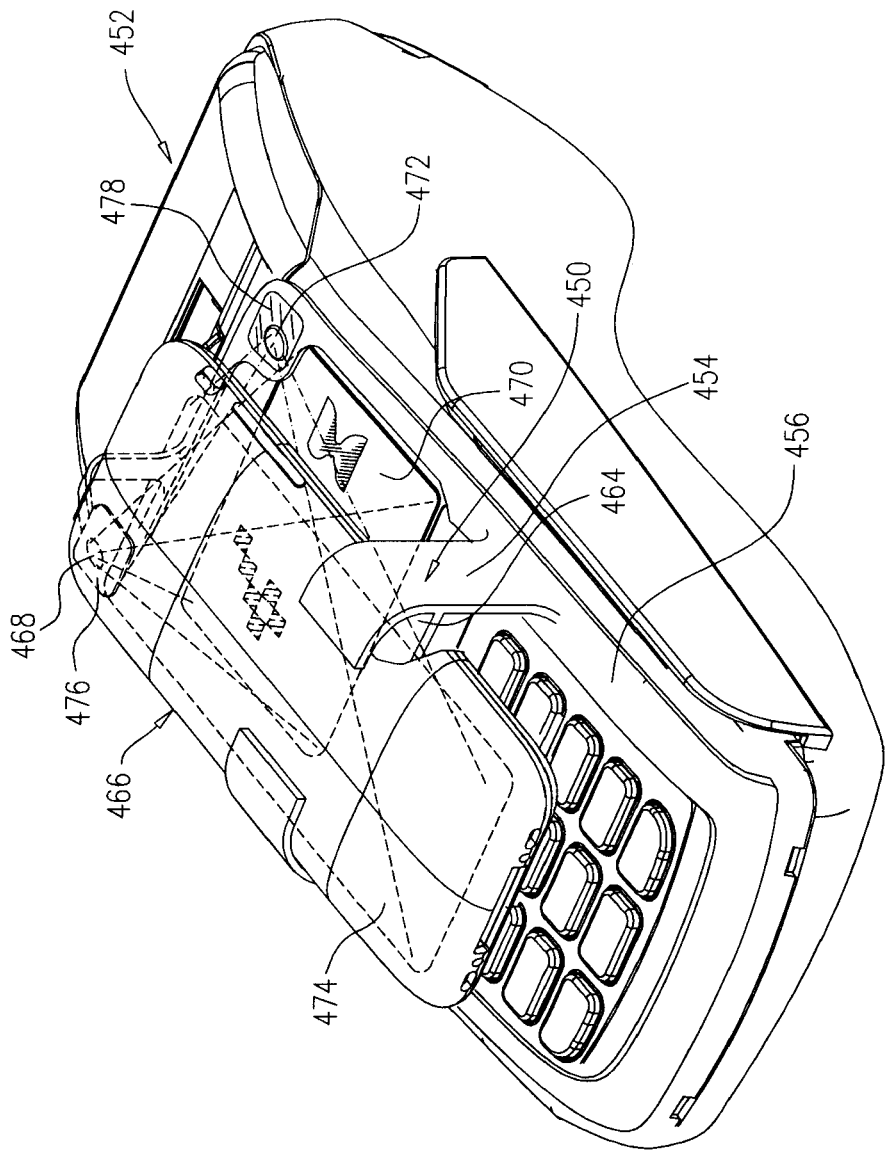

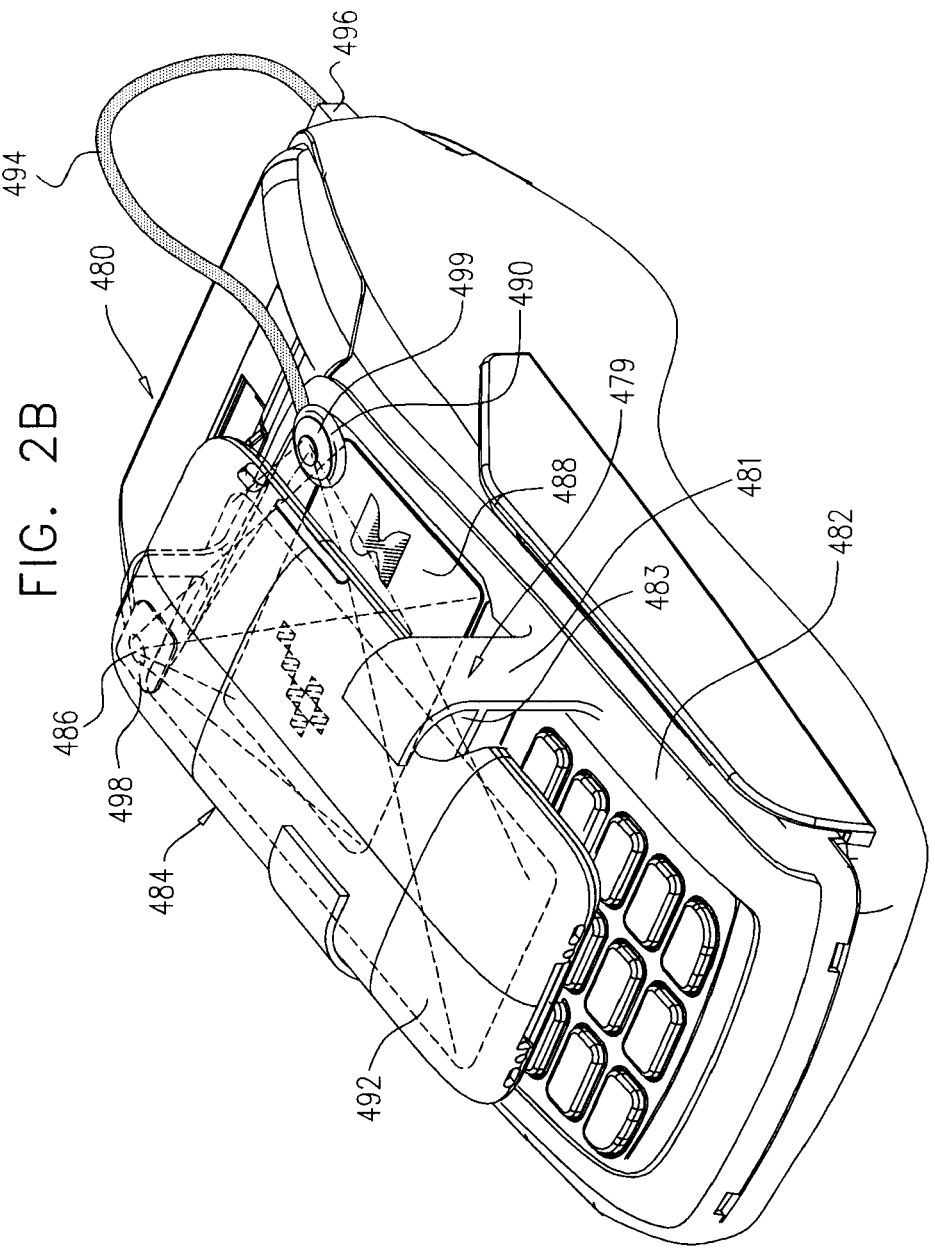

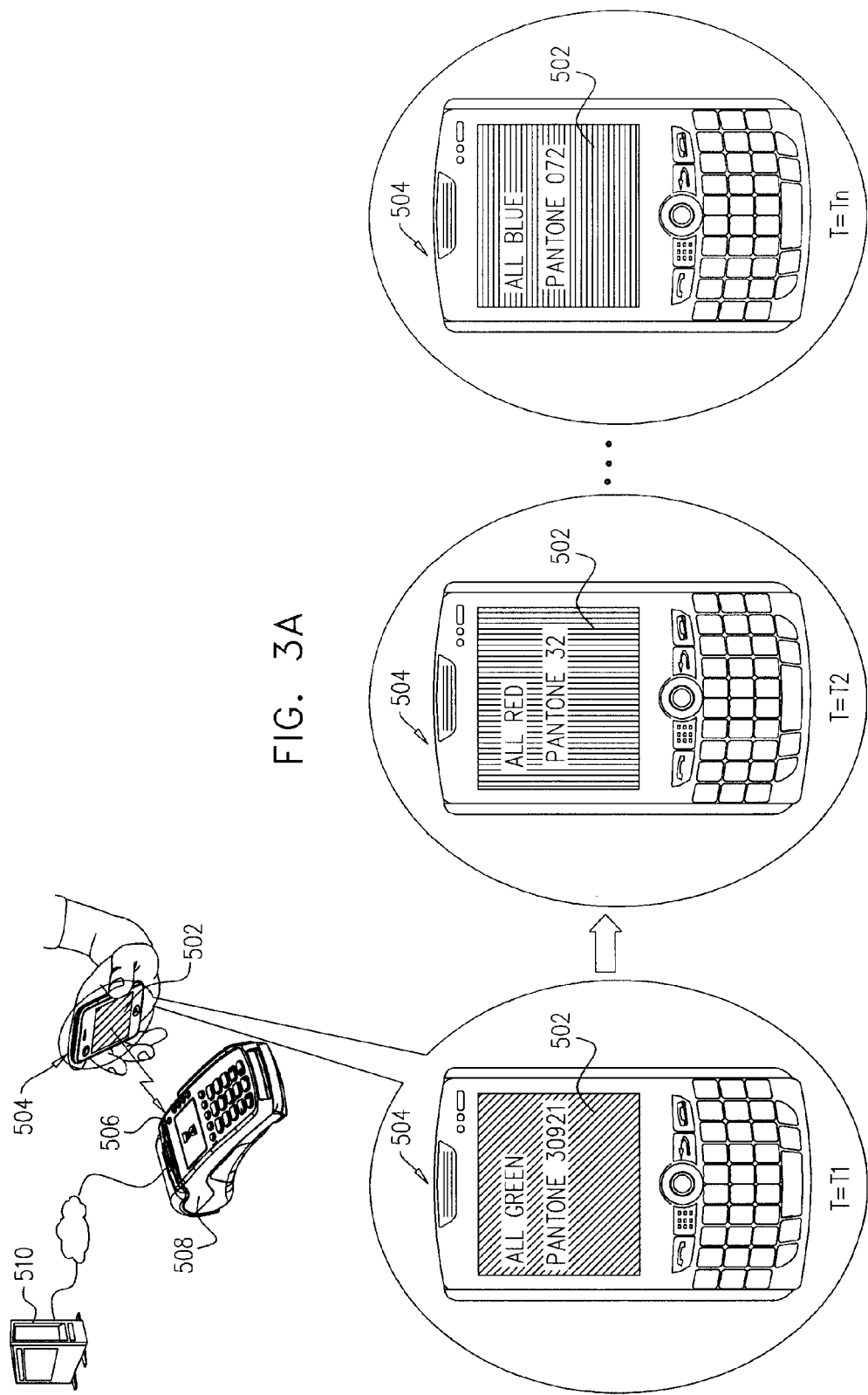

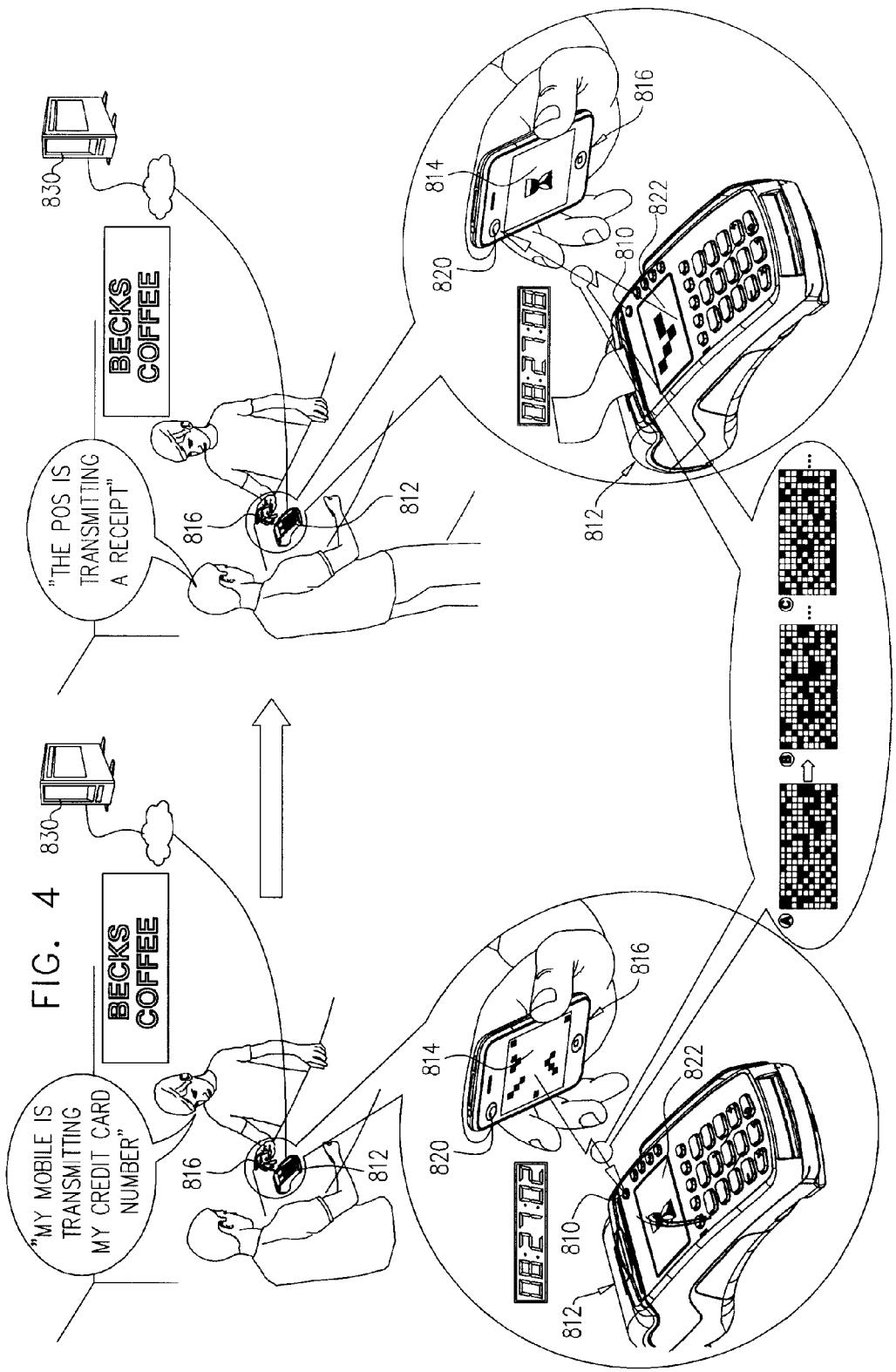

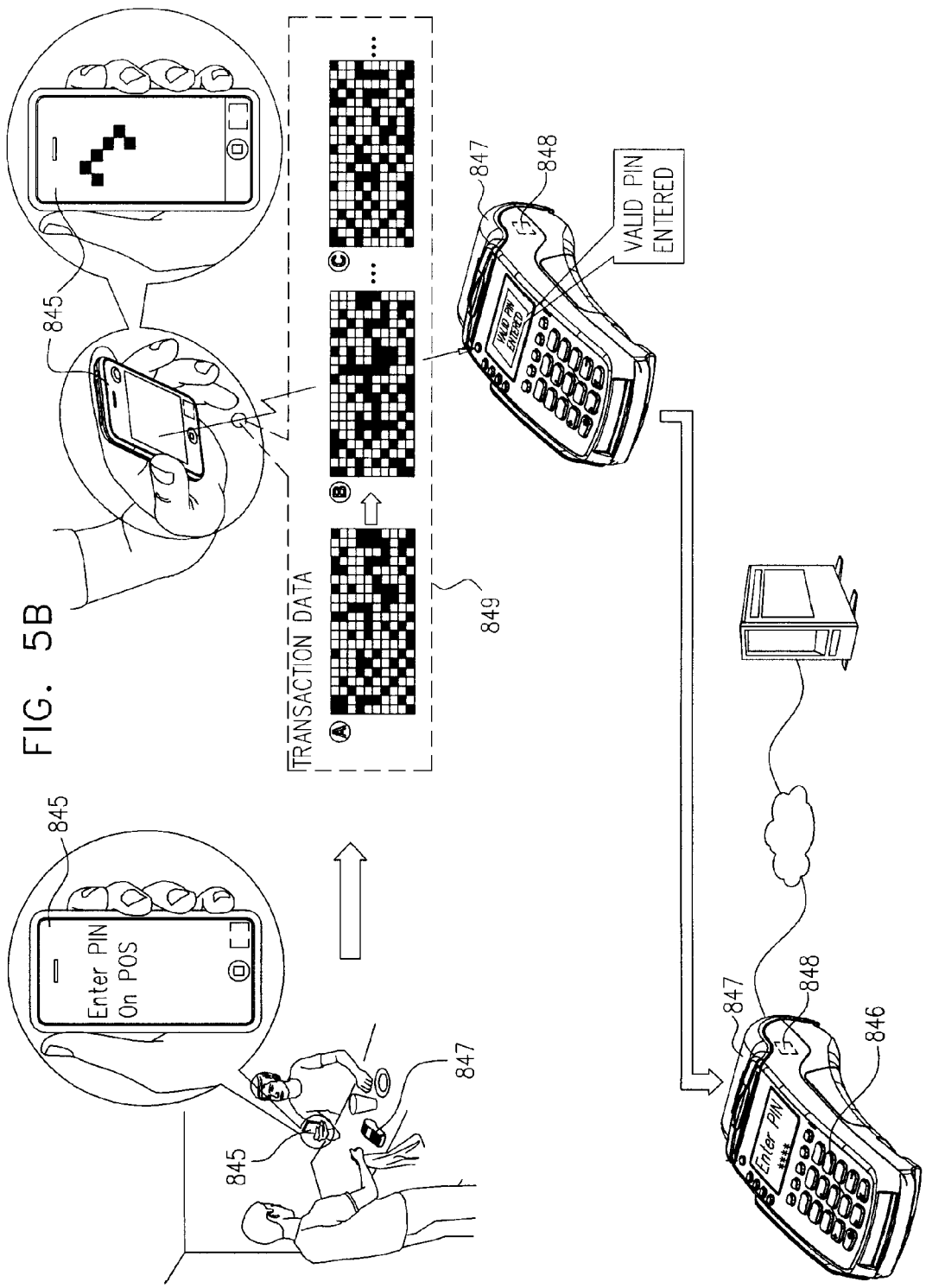

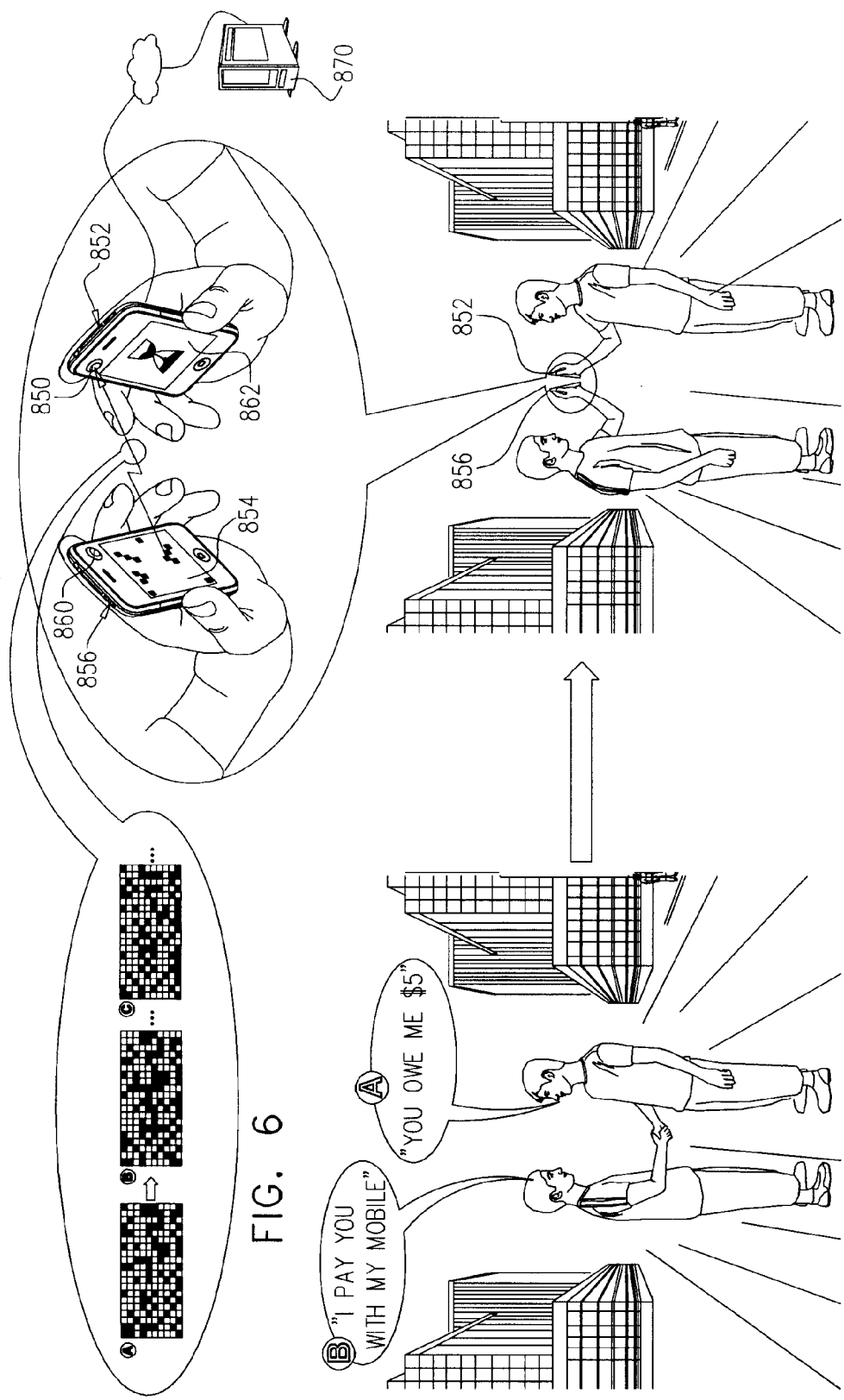

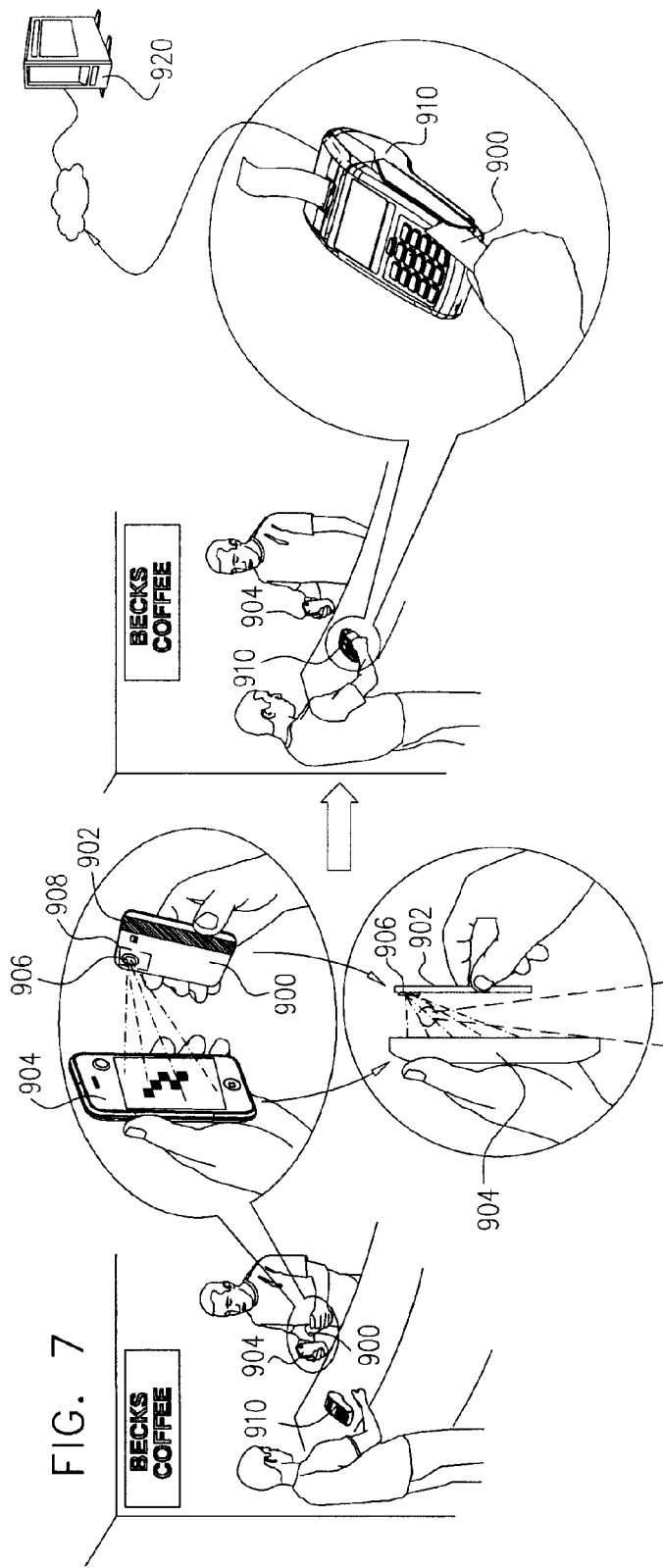
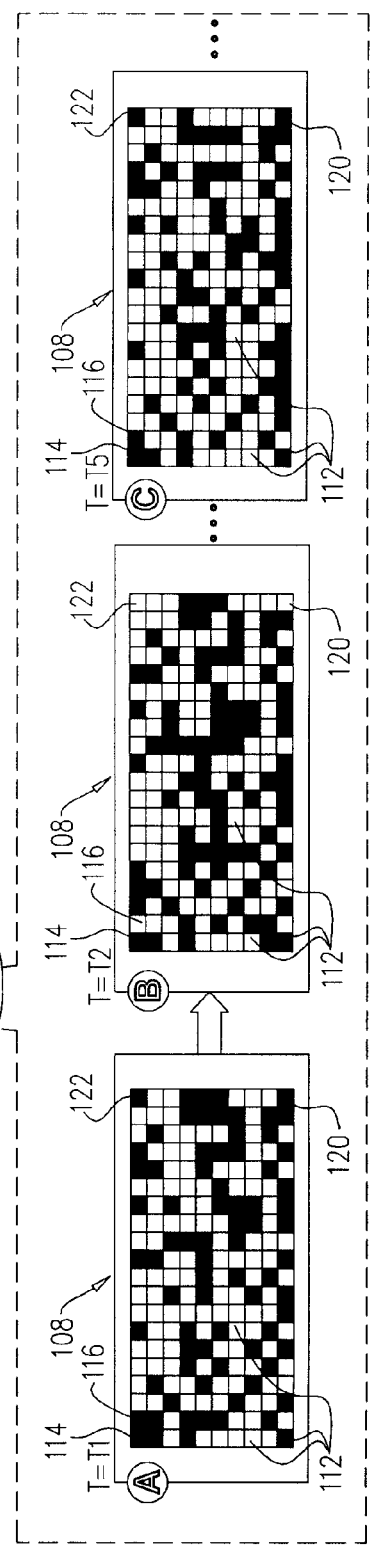
FIG. 7

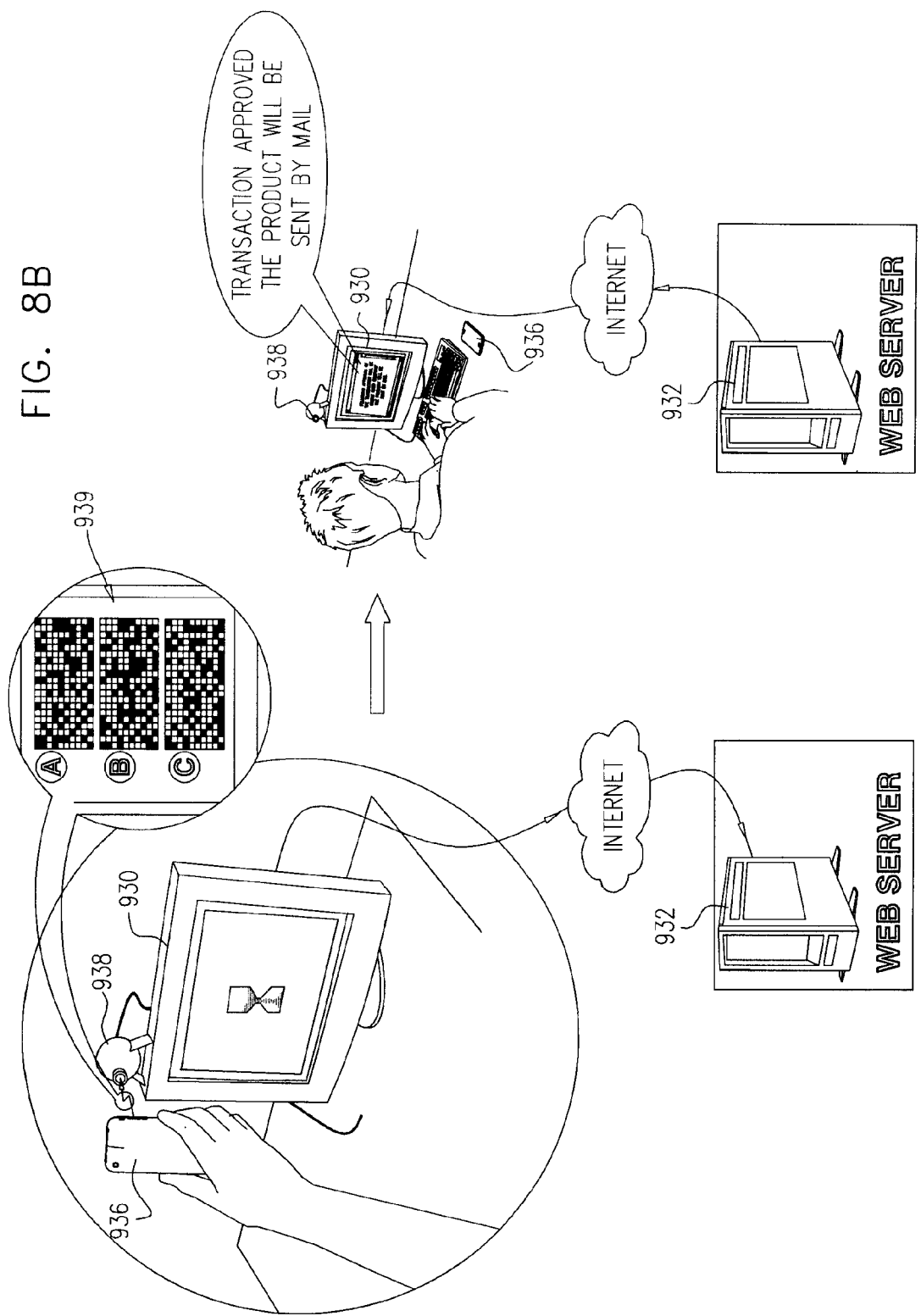

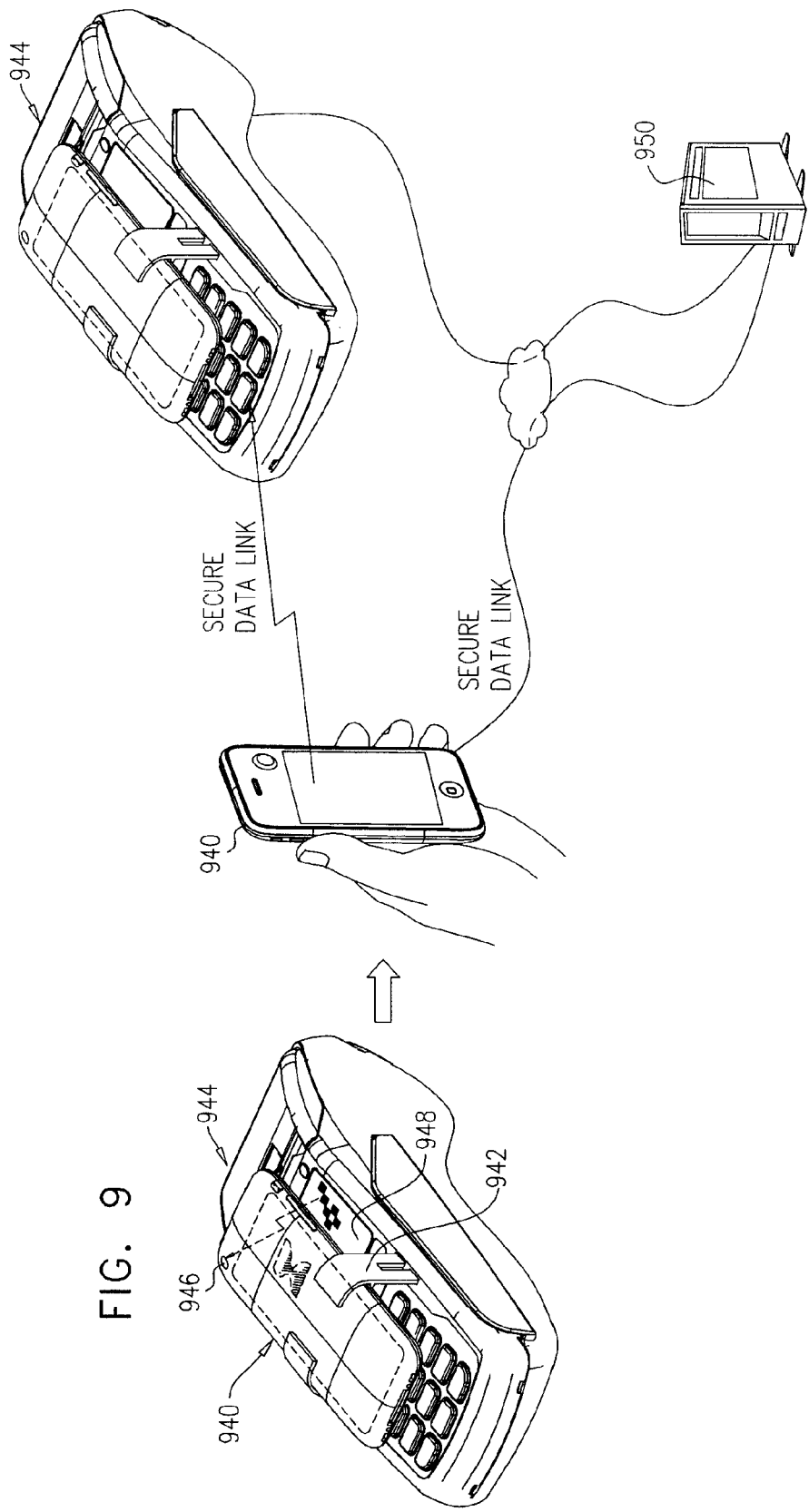

PAYMENT SYSTEMS AND METHODOLOGIES

REFERENCE TO RELATED APPLICATIONS

Reference is hereby made to U.S. Provisional Patent Application Ser. No. 61/340,594, filed Mar. 17, 2010 and entitled "Light-Based and Online Payment Systems and Methodologies", the disclosure of which is hereby incorporated by reference and priority of which is hereby claimed pursuant to 37 CFR 1.78(a) (4) and (5)(i).

FIELD OF THE INVENTION

The present invention relates generally to payment systems and methodologies and more particularly to payment systems and methodologies employing optical communications.

BACKGROUND OF THE INVENTION

The following patent publications are believed to represent the current state of the art:
U.S. Patent Publication Nos.: 2009/0084840; 2006/0293929; 2006/0131390, 2006/0131385; 2010/0030592; 2009/0281904; 2005/0203854; 2005/0256806 and 2004/0030659; and
U.S. Pat. Nos. 7,032,823; 7,392,388 and 6,736,322.

SUMMARY OF THE INVENTION

The present invention seeks to provide improved payment systems and methodologies.

There is thus provided in accordance with a preferred embodiment of the present invention a transaction system including at least two transaction communicators, at least one of which is a mobile communicator, at least one of the at least two transaction communicators having sequential visually sensible indicia generation functionality operative to generate a time sequence of indicia which provides at least transaction data and at least one of the at least two transaction communicators having sequential visually sensible indicia receiving functionality and transaction data extraction functionality capable of extracting at least the transaction data from the time sequence of particular indicia, whereby a time sequence of indicia which provides at least transaction data is transmitted from one of the at least two transaction communicators to another of the at least two transaction communicators.

In accordance with a preferred embodiment of the present invention the indicia are spatial patterns. Additionally or alternatively, the indicia are images. Additionally or alternatively, at least some of the indicia are in different colors.

Preferably, the time sequence of indicia includes a multiplicity of visually sensible indicia generated in a particular order. Additionally or alternatively, the time sequence of indicia includes a multiplicity of visually sensible indicia which are generated each time in a different order.

In accordance with a preferred embodiment of the present invention the time sequence has a particular order. Preferably, the time sequence represents a Morse-type code. Alternatively, the time sequence represents ASCII characters.

In accordance with a preferred embodiment of the present invention the time sequence includes visually sensible indicia of various colors.

Preferably, at least one of the at least two transaction communicators is a point of sale terminal.

There is also provided in accordance with another preferred embodiment of the present invention a point of sale transaction system including at least one point of sale terminal having magnetic card stripe reading functionality, at least one transaction card having a dynamically changeable magnetic stripe bearing transaction data and having optical transaction data reading functionality and functionality for encoding the transaction data onto the dynamically changeable magnetic stripe and at least one mobile communication device having visually sensible indicia generation functionality, the visually sensible indicia generation functionality being capable of generating indicia which provides at least the transaction data and which is readable by the at least one transaction card.

There is further provided in accordance with yet another preferred embodiment of the present invention a point of sale transaction system including a plurality of mobile communication devices having sequential time based visually sensible indicia generation functionality, the time based visually sensible indicia generation functionality being capable of generating a time sequence of indicia which together provides at least one of payment card data and coupon data and a point of sale terminal having a sequential time based visually sensible indicia receiving functionality and transaction data extraction functionality capable of extracting the at least one of payment card data and coupon data from the particular sequence of particular indicia.

Preferably, the time based visually sensible indicia are video images. Additionally or alternatively, at least some of the indicia are in different colors.

In accordance with a preferred embodiment of the present invention the particular sequence of particular indicia includes a multiplicity of visually sensible indicia generated in a particular time sequenced order. Additionally or alternatively, the particular sequence of particular indicia includes a multiplicity of visually sensible indicia which are generated each time in a different particular order.

There is even further provided in accordance with a preferred embodiment of the present invention a point of sale transaction system including a plurality of mobile communication devices having sequential time based visually sensible indicia generation functionality, the time based visually sensible indicia generation functionality being capable of generating a particular sequence of particular indicia which together provides at least payment card data and or coupon data and a point of sale terminal having sequential time based visually sensible indicia generation functionality, the time based visually sensible indicia generation functionality being capable of generating a particular sequence of particular indicia which together provides at least payment card handshaking and security confirmation data and or coupon acceptance data and a plurality of mobile communication devices having video cameras capable of assimilating sequential time based visually sensible indicia receiving functionality and transaction data extraction functionality capable of extracting at least the payment card handshaking and security confirmation data and or coupon acceptance data from the particular sequence of particular indicia.

Preferably, the time sequence of indicia includes a multiplicity of visually sensible indicia which are generated each time in a different order.

In accordance with a preferred embodiment of the present invention the indicia are spatial patterns.

BRIEF DESCRIPTION OF THE DRAWINGS

The invention will be understood and appreciated more fully from the following detailed description which refers to the following drawings:

FIG. 1A is a simplified, partially pictorial, partially diagrammatic illustration of a first embodiment of the present invention;

FIG. 1B is a simplified, partially pictorial, partially diagrammatic illustration of a second embodiment of the present invention;

FIG. 1C is a simplified, partially pictorial, partially diagrammatic illustration of a third embodiment of the present invention;

FIG. 1D is a simplified, partially pictorial, partially diagrammatic illustration of a fourth embodiment of the present invention;

FIGS. 2A and 2B are simplified illustrations of two alternative embodiments of a POS and a mobile communicator mounted for operative engagement onto a POS-mobile communicator propinquity cradle;

FIG. 3A is a simplified, partially pictorial, partially diagrammatic illustration of a fifth embodiment of the present invention;

FIG. 4 is a simplified illustration of the use of a POS and a mobile communicator for bi-directional communication of visually sensible indicia for use in any of the embodiments of the present invention;

FIGS. 5A and 5B are simplified illustrations of two alternative operative embodiments of a POS and a mobile communicator operative for PIN entry;

FIG. 6 is a simplified illustration of the use of a first mobile communicator and a second mobile communicator for bi-directional communication of visually sensible indicia for use in any of the embodiments of the present invention;

FIG. 7 is a simplified illustration of the use of transaction functionality in accordance with any of the suitable embodiments of the present invention in association with a conventional magnetic stripe reading POS terminal;

FIGS. 8A and 8B are together a simplified illustration of use of on-line payment functionality in accordance with an embodiment of the present invention;

FIG. 9 is a simplified illustration of on-line payment functionality in accordance with another embodiment of the present invention;

DETAILED DESCRIPTION OF PREFERRED EMBODIMENTS

Figure 3B:
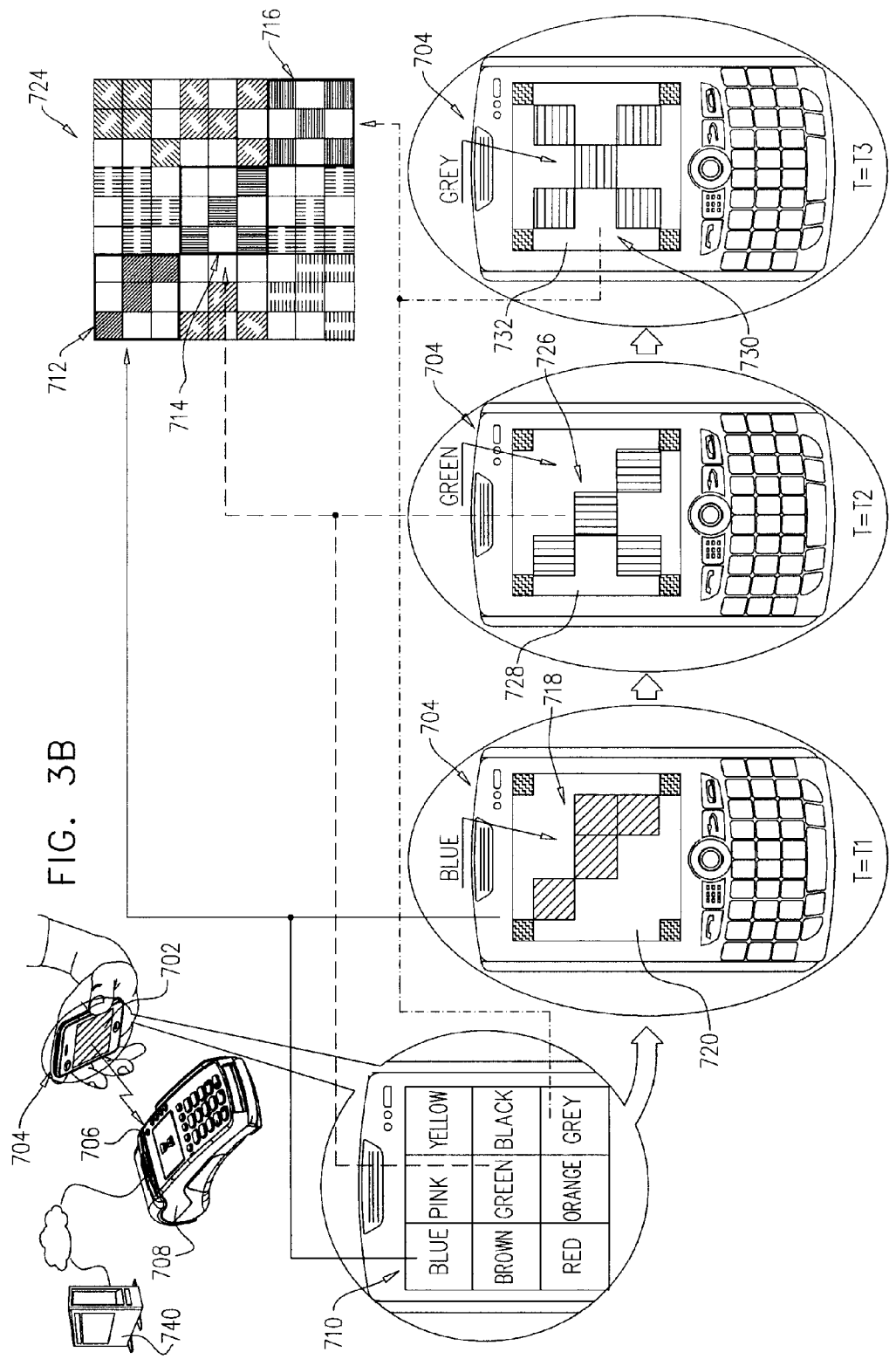
FIG. 3B is a simplified, partially pictorial, partially diagrammatic illustration of a sixth embodiment of the present invention.

Reference is now made to FIG. 1A, which is a simplified, partially pictorial, partially diagrammatic illustration of a point of sale transaction system constructed and operative in accordance with a first embodiment of the present invention. As seen in FIG. 1A, a customer makes payment for a purchase by employing a mobile communication device (mobile communicator) 100 having sequential visually sensible indicia generation functionality which generates a sequence of particular indicia on a display screen 102 thereof, which sequence together provides at least transaction data. The transaction data typically includes payment card identification data and preferably also includes identification data relating to the mobile communicator 100. In addition to transaction data, the sequence may provide additional data, such as, for example, personal data relating to the mobile communicator subscriber, time, date and location data and biometric or other authentication data.

A camera-equipped point of sale device (POS) 104, including a camera 106, preferably operating in a video mode, having sequential visually sensible indicia receiving functionality and transaction data extraction functionality, optically reads the sequence of indicia displayed on screen 102 and extracts at least transaction data from the sequence of indicia. Camera-equipped point of sale devices 104 are not believed to be currently available on the market.

A suitable type of POS, such as a VX570, commercially available from Verifone, Inc., may be readily modified in accordance with the teachings of the present invention to include a camera 106 as well as sequential visually sensible indicia receiving functionality and transaction data extraction functionality. The point of sale device may be an existing terminal or a cash register, such as that provided by VeriFone Inc. for the swiping of magnetic cards or receiving NFC signals and is preferably capable of accepting data signals from the camera and processing such signals in the same manner that information from a magnetic card swipe or a wireless signal is processed.

A suitable type of mobile communicator, such as an IPHONE®, may store payment card data and/or function as an electronic wallet. Preferably, the mobile communicator includes functionality enabling a user to select one or a plurality of available payment cards for use in a given transaction. Additionally, the mobile communicator may employ suitable data encryption functionality.

In the embodiment of FIG. 1A, the sequentially visually sensible indicia are a time sequence of two-dimensional arrays 108 of selectably illuminatable pixels 112. Three such two-dimensional arrays 108 are shown and designated by the letters A, B and C. Two-dimensional array A represents an array displayed by the mobile communication device 100 at a time slot T1, while two-dimensional array B represents a pattern displayed at a time slot T2 and two-dimensional array C represents a pattern displayed at a time slot T5.

In the illustrated embodiment of FIG. 1A, each of selectably illuminatable pixels 112 is illuminated in a suitable time sequence to constitute a time sequence of visually sensible indicia representing the user's transaction data. The two-dimensional arrays A, B and C appearing in FIG. 1A may be understood to represent either, and preferably both, the display screen 102 of a mobile communicator 100 and the image plane of camera 106 of POS 104, viewing the display screen 102 of mobile communicator 100.

In the example of FIG. 1A, the array is typically a 20×10 array, including a total of 200 pixels, each of which is independently illuminated. In the illustrated embodiment of FIG. 1A, the illumination sequence of each pixel represents a given alphanumeric character in a Morse type code. FIG. 1A shows the array 108 at three different points in time, T=T1, T=T2 and T=T5.

The order of the characters may be arbitrarily set in advance, for example, where the top left pixel 114 represents the first character in a string, the top second from left pixel 116 represents the second character in the string, etc.

In the Morse-type code of FIG. 1A, a total of typically 20 points in time are required in order to represent all English language letters and numbers from 0-9.

In the embodiment of FIG. 1A, each pixel of each two-dimensional array in the sequence represents a different alpha-numeric character. Thus for example, the sequence of black and white squares appearing in the bottom right hand corner pixel 112 of the arrays, here designated as pixel 120, represents the number 1 expressed in Morse code, while the sequence of black and white squares appearing in the top right hand corner pixel 112 of the arrays, here designated as pixel 122, represents the character A expressed in Morse code.

Thus, as seen in FIG. 1A, the letter A, here displayed at pixel 122 in the sequence, is typically represented by an initial illumination, here shown in black, at time T=T1, followed by a non-illumination at time T=T2, followed by illumination at times T=T3, T=T4 and T=T5. This corresponds to the Morse code for the letter A which is one short pulse T1 followed by one long pulse T3-T5.

Similarly, the letter 1, here displayed at pixel 114 in the sequence, is typically represented by an initial illumination at time T=T1, followed by a non-illumination at time T=T2, followed by illumination at times T=T3, T=T4, T=T5, followed by a non-illumination at time T=T6, followed by illumination at times T=T7, T=T8, T=T9, followed by a non-illumination at time T=T10, followed by illumination at times T=T11, T=T12, T=T13, followed by a non-illumination at time T=T14, followed by illumination at times T=T15, T=T16, T=T17, followed by a non-illumination at time T=T18. This corresponds to the Morse code for the letter 1 which is one short pulse T1 followed by four long pulses, T3-T5, T7-T9, T11-T13 and T15-T17.

It is appreciated that in the illustrated embodiment of FIG. 1A, each short pulse is represented by illumination of the corresponding pixel during a single time slot, while each long pulse is represented by illumination of the corresponding pixel during three consecutive time slots. It is further appreciated that each pulse is separated by non-illumination of the corresponding pixel during a single time slot. Alternatively, any suitable representation of short and long pulses and pulse separation may be used.

From this initial example as well as from the additional examples which are described herein with reference to FIGS. 1B-1D and 3A-3B, it may be appreciated that embodiments of the present invention employ light sequences, rather than magnetic or radio frequency (RF) communication as in the prior art, to communicate transaction data such as, for example, credit, debit, or other account information, between a customer and a merchant in the course of effecting a purchase.

The mobile communication device, such as device 100 shown in FIG. 1A, may be any suitable hand held device, such as a mobile telephone, smart phone, a tablet, a personal computer, PDA or similar device which displays a time sequence of visually sensible indicia, preferably a sequence of patterns, preferably on its own screen. In accordance with a preferred embodiment of the present invention, the sequence of visually sensible indicia, taken together, includes transaction data, for example, information such as the user's payment card data, e.g. credit card data, and more generally information enabling payment from a user to a merchant via conventional credit card or debit card transaction networks and functionalities.

As noted hereinabove, mobile communicator 100 preferably includes sequential visually sensible indicia generation functionality operative to generate a sequence of particular indicia on display screen 102, which sequence together provides at least transaction data. A preferred embodiment of sequential visually sensible indicia generation functionality is described hereinbelow with reference to FIG. 10.

As noted hereinabove, POS 104 preferably includes sequential visually sensible indicia receiving functionality and transaction data extraction functionality operative to extract at least transaction data from the sequence received. A preferred embodiment of sequential visually sensible indicia receiving functionality and transaction data extraction functionality is described hereinbelow with reference to FIG. 11. As seen in FIG. 1A, POS 104 is operative to communicate at least a portion of the information extracted, including at least payment card data, to a financial processor 130 to complete a transaction between the user of the handheld device and the merchant.

In the scenarios illustrated generally in FIGS. 1A-1D, when a user wishes to pay a merchant, he operates a payment application in his mobile communicator, such as mobile communicator 100 in the embodiment of FIG. 1A, in accordance with an embodiment of the present invention.

Referring for example to FIG. 1A, it is seen that the user points the screen 102 of the mobile communicator 100 toward the camera 106 associated with the POS 104. The camera 106 captures the sequence, and software within or otherwise associated with the POS 104 extracts payment data from the sequence of the visually sensible indicia and further transmits the payment data to financial processor 130 to complete the financial transaction. It is appreciated that payment data is included within a general definition of transaction data.

More generally, the visually sensible indicia may be any suitable time-and/or-color based sequence of images, each image in the sequence representing at least a part of at least one number or/and letter and/or other character and preferably at least a part of multiple numbers and/or letters and/or other characters.

The mobile communicator 100 may generate the time-based visually sensible indicia by referring to a set of rules that stipulate the length of time, and optionally the color and the elapsed time between the elements of the sequence, that are required to communicate a number or a letter. Morse code is an example of one set of rules which may be used by the mobile communicator 100 to establish the visually sensible indicia, that need not use color. The video images of the visually sensible indicia received by POS 104 may be converted into alphanumeric data by referring to the same set of rules, such as Morse code, to re-assemble the series of light sequences back to a letter or number.

It is appreciated that the start of the sequence representing each character need not occur simultaneously. Start and stop indicia may be provided if needed, on a character by character basis or for the entire array. In this embodiment, the start and stop indicia may employ colors not otherwise utilized for encoding alphanumeric characters.

Reference is now made to FIG. 1B, illustrating an alternative embodiment of the present invention which employs color modulation and thus reduces the number of points in time which are required in order to represent all English language letters and numbers from 0-9.

FIG. 1B illustrates an embodiment of the invention which employs an array 200 of selectably colorably illuminated pixels 202 whose illumination and color in a time sequence constitutes a time sequence of visually sensible indicia representing the transaction data. FIG. 1B may be understood to represent either, and preferably both, the display screen 203 of a mobile communicator 204 and the image plane of a camera 208, associated with a POS 210, viewing the display screen 203.

In the example of FIG. 1B, the array is typically a 20×10 array, including a total of 200 pixels, each of which is independently illuminated in one of two selectable colors, typically red and blue. In the illustrated embodiment of FIG. 1B, the color and illumination sequence of each pixel represents a given alphanumeric character in a modified Morse type code.

The order of the characters may be arbitrarily set in advance, for example, where the top left pixel 214 represents the first character in a string of alphanumeric characters, the top second from left pixel 216 represents the second character in the string, etc.

In the modified Morse-type code employed in the embodiment of FIG. 1B, a total of typically five points in time are required in order to represent all English language letters and numbers from 0-9.

Thus, as seen in FIG. 1B, the number 1 is typically represented by an initial red illumination at time T=T1, followed by a blue illumination at times T=T2, T=T3, T=T4 and T=T5, as seen in the bottom right hand corner pixel 202, here designated as pixel 220. This corresponds to the Morse code for the number 1 which is one short pulse followed by four long pulses, wherein short pulses are represented by the color red and long pulses are represented by the color blue.

Similarly, letter A is typically represented by an initial red illumination at time T=T1, followed by a blue illumination at time T=T2, as seen in the top right hand corner pixel 202, here designated as pixel 222. This corresponds to the Morse code for the letter A, which is one short pulse followed by one long pulse, wherein short pulses are represented by the color red and long pulses are represented by the color blue.

It is seen that each of the pixels 202 in array 200 may operate in the same manner, independently of each other pixel. This is illustrated, for example in FIG. 1B, which shows the array 200 at three different points in time, T=T1, T=T2 and T=T5.

It is appreciated that the start of the sequence representing each character need not occur simultaneously. Start and stop indicia may be provided if needed, on a character-by-character basis or for the entire array. In this embodiment, the start and stop indicia may employ colors not otherwise utilized for encoding alphanumeric characters.

Mobile communicator 204 preferably includes sequential visually sensible indicia generation functionality operative to generate a sequence of particular indicia on display screen 203, which sequence together provides at least transaction data. A preferred embodiment of sequential visually sensible indicia generation functionality is described hereinbelow with reference to FIG. 10.

POS 210 preferably includes sequential visually sensible indicia receiving functionality and payment data extraction functionality operative to extract at least payment data from the sequence received. A preferred embodiment of sequential visually sensible indicia receiving functionality and transaction data extraction functionality is described hereinbelow with reference to FIG. 11. As seen in FIG. 1B, POS 210 is operative to communicate at least a portion of the information extracted, including at least payment card data, to a financial processor 230, to complete a transaction between the user of the handheld device and the merchant.

Reference is now made to FIG. 1C, which illustrates a further alternative embodiment of the present invention which employs pattern modulation and thus reduces the number of points in time which are required in order to represent all English language letters and numbers from 0-9.

FIG. 1C illustrates an embodiment of the invention which employs an array 300 of selectably illuminated pixels 302 whose illumination in a time sequence constitutes a time sequence of visually sensible indicia representing transaction data. In this embodiment, the number of pixels 302 required in pixel array 300 is significantly greater than the number of pixels required in the embodiments of FIGS. 1A and 1B. A typical pixel array 300 suitable for use in the embodiment of FIG. 1C contains approximately 2000 pixels.

FIG. 1C may be understood to represent either, and preferably both, of the display screen 303 of a mobile communicator 304 and the image plane of a camera 308, associated with a POS 310, viewing the display screen 303.

In the example of FIG. 1C, the array is typically a 60×30 array, including 1800 pixels 302, each of which is independently illuminated. In the illustrated embodiment of FIG. 1C, the illumination sequence of each group 314 of 9 contiguous pixels in a 3×3 arrangement, represents a given alphanumeric character in another modified Morse type code.

The order of the characters may be arbitrarily set in advance, for example, where the top left group 316 of pixels 302 represents the first character in a string of alphanumeric characters, the top, second from left group 318 of pixels 302 represents the second character in the string, etc.

In the modified Morse-type code employed in the embodiment of FIG. 1C, a total of typically five points in time are required in order to represent all English language letters and numbers from 0-9.

Thus, as seen in FIG. 1C, the letter A is typically represented by an initial illumination of all of the pixels 302 in a top right hand group 314, here designated as group 320, in the form of a square at time T=T1, followed by an illumination of some of the pixels 302 in group 320 in the form of a cross, at time T=T2. This corresponds to the Morse code for the letter A which is one short pulse followed by one long pulse, wherein short pulses are represented by a square and long pulses are represented by a cross.

Similarly, the number 1 is typically represented by an initial illumination of all of the pixels 302 in a bottom right hand group 314, here designated as group 322, in the form of a square at time T=T1, followed by illumination of some of the pixels 302 in group 322 in the form of a cross at times T=T2, T=T3, T=T4 and T=T5. This corresponds to the Morse code for the number 1 which is one short pulse followed by four long pulses, wherein short pulses are represented by a square and long pulses are represented by a cross.

It is seen that each of the groups of pixels 302 in array 300 may operate in the same manner, independently of each other pixel. This is illustrated, for example in FIG. 1C, which shows the array 300 at three different points in time, T=T1, T=T2 and T=T5.

It is appreciated that the start of the sequence representing each character need not occur simultaneously. Start and stop indicia may be provided if needed, on a character-by-character basis or for the entire array. In this embodiment, the start and stop indicia may employ colors.

Mobile communicator 304 preferably includes sequential visually sensible indicia generation functionality operative to generate a sequence of particular indicia on display screen 303, which sequence together provides at least transaction data. A preferred embodiment of sequential visually sensible indicia generation functionality is described hereinbelow with reference to FIG. 10.

POS 310 preferably includes sequential visually sensible indicia receiving functionality and transaction data extraction functionality operative to extract at least transaction data from the sequence received. A preferred embodiment of sequential visually sensible indicia receiving functionality and transaction data extraction functionality is described hereinbelow with reference to FIG. 11. As seen in FIG. 1C, POS 310 is operative to communicate at least a portion of the information extracted, including at least payment card data, to a financial processor 330 to complete a transaction between the user of the handheld device and the merchant.

Reference is now made to FIG. 1D, which illustrates yet another alternative embodiment of the present invention, which employs color modulation of ASCII code type, representing all English language letters and numbers from 0-9 and additional characters and symbols.

FIG. 1D illustrates an embodiment of the invention which employs an array 400 of selectably colorably illuminated pixels 402 whose illumination and color in a time sequence constitutes a time sequence of visually sensible indicia representing transaction data.

FIG. 1D may be understood to represent either, and preferably both, of the display screen 403 of a mobile communicator 404 and the image plane of a camera 408, associated with a POS 410, viewing the display screen 403.

In the example of FIG. 1D, the array is typically a 20×10 array, including a total of 200 pixels, each of which is independently illuminated in one of two selectable colors, typically red and blue. In the illustrated embodiment of FIG. 1D, the color and illumination sequence of each pixel represents a given character in an ASCII type code.

The order of the characters may be arbitrarily set in advance, for example, where the top left pixel 414 represents the first character in a string of alphanumeric characters, the top second from left pixel 416 represents the second character in the string, etc.

In the coding employed in the embodiment of FIG. 1D, a total of typically seven points in time are required in order to represent all 128 ASCII code characters, while eight points in time are typically required to represent all 256 extended ASCII code characters.

Thus, as seen in FIG. 1D, the letter A is typically represented by an initial red illumination at time T=T1, as seen in the top right hand corner pixel 402, here designated as pixel 420, followed by a blue illumination at times T=T2, as seen in the top right hand corner pixel 402, here designated as pixel 420, T=T3, T=T4, T=T5, as seen in the top right hand corner pixel 402, here designated as pixel 420, T=T6, followed by a red illumination at time T=T7. This corresponds to the ASCII code for the letter A which is 1000001, wherein the digit 1 is represented by the color red and the digit 0 is represented by the color blue.

Similarly, the number 1 is typically represented by an initial blue illumination at time T=T1, as seen in the bottom right hand corner pixel 402, here designated as pixel 422, followed by a red illumination at time T=T2, as seen in the bottom right hand corner pixel 402, here designated as pixel 422 and T=T3, followed by blue illumination at times T=T4, T=T5, as seen in the bottom right hand corner pixel 402, here designated as pixel 422, and T=T6, followed by a red illumination at T=T7. This corresponds to the ASCII code for the number 1 which is 0110001, wherein the digit 1 is represented by the color red and the digit 0 is represented by the color blue.

It is seen that each of the pixels 402 in array 400 may operate in the same manner, independently of each other pixel.

It is appreciated that the start of the sequence representing each character need not occur simultaneously. Start and stop indicia may be provided if needed, on a character-by-character basis or for the entire array. In this embodiment, the start and stop indicia may employ colors not otherwise utilized for encoding alphanumeric characters.

Mobile communicator 404 preferably includes sequential visually sensible indicia generation functionality operative to generate a sequence of particular indicia on display screen 403, which sequence together provides at least transaction data. A preferred embodiment of sequential visually sensible indicia generation functionality is described hereinbelow with reference to FIG. 10.

POS 410 preferably includes sequential visually sensible indicia receiving functionality and transaction data extraction functionality operative to extract at least transaction data from the sequence received. A preferred embodiment of sequential visually sensible indicia receiving functionality and transaction data extraction functionality is described hereinbelow with reference to FIG. 11. As seen in FIG. 1D, POS 410 is operative to communicate at least a portion of the information extracted, including at least payment card data, to a financial processor 430 to complete a transaction between the user of the handheld device and the merchant.

It is appreciated that in the foregoing description, the term "pixel" refers to an independently illuminatable and readable two-dimensional unit. Thus the pixels referred to above may be identical to the pixels of the display of the mobile communicator and of the camera. Alternatively, for reasons of resolution or convenience, each pixel referred to in the foregoing description may be made up of multiple pixels of the display of the mobile communicator and of the camera, which are controlled together and are illuminated or non illuminated as a unit.

Reference is now made to FIG. 2A, which is a simplified illustration of an integrally mounted camera equipped POS and a mobile communicator mounted for operative engagement onto a POS-mobile communicator propinquity cradle. In FIG. 2A, a POS—mobile communicator propinquity cradle 450 is shown mounted onto a POS 452, such as a VX570, commercially available from Verifone, Inc. Alternatively, cradle 450 may be integrally formed of a portion of the housing of POS 452.

The cradle 450, preferably comprising a pair of upstanding side supports 454 which are mounted onto a POS attachment portion 456 and each define a mobile communicator support portion 464. Mobile communicator support portion 464 may be configured in one or more desired configurations and preferably is configured to accommodate some or all of the most common mobile communicators, such as an IPHONE®, here designated by reference numeral 466.

In the illustrated embodiment, the mobile communicator 466 is readily removably slidable into spatially stable engagement with the support portions 464 preferably such that a camera 468 of mobile communicator 466 views a display screen 470 of POS 452 and that a camera 472 of POS 452 views a display screen 474 of mobile communicator 466. Suitable lenses, such as Fresnel lenses 476 and 478 may be mounted on cradle 450 in operative association with respective cameras 468 and 472 to suitably directly light from respective display screens 470 and 474 to respective cameras 468 and 472.

Alternatively, only one of the above two viewing functionalities may be provided, that is either camera 468 of mobile communicator 466 views a display screen 470 of POS 452 or a camera 472 of POS 452 views a display screen 474 of mobile communicator 466.

Reference is now made to FIG. 2B, which is a simplified illustration of a retrofit camera equipped POS and a mobile communicator mounted for operative engagement onto a POS-mobile communicator propinquity cradle. In FIG. 2B, a POS—mobile communicator propinquity cradle 479 is shown mounted onto a POS 480, such as a VX570, commercially available from Verifone, Inc. Alternatively, cradle 479 may be integrally formed of a portion of the housing of POS 480.

The cradle 479, preferably comprising a pair of upstanding side supports 481 which are mounted onto a POS attachment portion 482 and each define a mobile communicator support portion 483. Mobile communicator support portion 483 may be configured in one or more desired configurations and preferably is configured to accommodate some or all of the most common mobile communicators, such as an IPHONE®, here designated by reference numeral 484.

In the illustrated embodiment, the mobile communicator 484 is readily removably slidable into spatially stable engagement with the support portions 483 preferably such that a camera 486 of mobile communicator 484 views a display screen 488 of POS 480 and that a camera 490 of POS 480 views a display screen 492 of mobile communicator 484. Here camera 490 is preferably mounted on a repositionable mounting arm 494 and is coupled to POS 480, typically via a USB connector 496 which is removably inserted into a suitable socket (not shown) in POS 480.

Suitable lenses, such as Fresnel lenses 498 and 499, may be provided in operative association with respective cameras 468 and 490 to suitably directly light from respective display screens 488 and 492 to respective cameras 486 and 490.

Alternatively, only one of the above two viewing functionalities may be provided, that is either camera 486 of mobile communicator 484 views a display screen 488 of POS 480 or a camera 490 of POS 480 views a display screen 492 of mobile communicator 484.

Reference is now made to FIG. 3A, which is a simplified, partially pictorial, partially diagrammatic illustration of a point of sale transaction system constructed and operative in accordance with a fifth embodiment of the present invention.

As seen in FIG. 3A, the visually sensible indicia may be a sequence of different colors. FIG. 3A shows a screen 502 of a mobile communicator 504 which appears sequentially in various different colors, thus creating a time sequence of visually sensible indicia. The visually sensible indicia are preferably read by a camera 506 associated with a POS 508.

Each color may represent a different ASCII code character, for example, A is represented by the color green, 1 is represented by the color red etc. It is seen that at time T=T1, all pixels of the display are illuminated in green, at time T=t2 all pixels of the display are illuminated in red, corresponding to a string starting with the character A followed by the character 1.

Mobile communicator 504 preferably includes sequential visually sensible indicia generation functionality operative to generate a sequence of particular indicia on display screen 502, which sequence together provides at least transaction data. A preferred embodiment of sequential visually sensible indicia generation functionality is described hereinbelow with reference to FIG. 10.

POS 508 preferably includes sequential visually sensible indicia receiving functionality and transaction data extraction functionality operative to extract at least transaction data from the sequence received. A preferred embodiment of sequential visually sensible indicia receiving functionality and transaction data extraction functionality is described hereinbelow with reference to FIG. 11. As seen in FIG. 3A, POS 508 is operative to communicate at least a portion of the information extracted, including at least payment card data, to a financial processor 510, in order to complete a transaction between the user of the handheld device and the merchant.

Reference is now made to FIG. 3B, which illustrates an embodiment of the present invention wherein each of the visually sensible indicia may include an image which may be divided into a predetermined number of spatial segments, each segment being represented, for example, by a different color. For simplicity, a screen 702 of a mobile communicator 704 shown in FIG. 3B is divided into nine segments. It can be understood that the screen may be divided into any other suitable number of segments. The visually sensible indicia are preferably read by a camera 706 associated with a POS 708.

The color coding of each of the nine segments may be predetermined and known to both the mobile communicator 704 and to the POS 708. Alternatively, the mobile communicator 704 may display a screen such as screen 710 having nine differently colored segments which is seen by the camera 706 of the POS 708. In this way the color coding of the various segments is synchronized between the mobile communicator 704 and the POS 708.

In this example, preferably the mobile communicator 704 transmits a sequence of colors which indicates the sequence in which data is to be transmitted to the POS. As seen in screen 710, the sequence, BLUE, GREEN, GREY, . . . indicates that data for the top left segment, here designated as segment 712, of the image is to be transmitted initially, followed by the middle segment, here designated as segment 714, followed by the bottom right segment, here designated as segment 716, etc.

Thereafter, the mobile communicator 704 displays a pattern 718, such as that shown in screen 720, which is received by the camera 706 of the POS 708 and is placed in the top left segment 712 of an image 724 stored in the POS 708. Next, the mobile communicator displays a pattern 726, such as that shown in screen 728, which is received by the camera 706 of the POS 708 and is placed in the middle segment 714 of image 724 stored in the POS 708.

Next, the mobile communicator 704 displays a pattern 730, such as that shown in screen 732, which is received by the camera 706 of the POS 708 and is placed in the bottom right segment 716 of the image 724 stored in the POS 708, etc.

It can be seen that top left segment 712 corresponds to the location of the Blue segment in screen 710, middle segment 714 corresponds to the Green segment in screen 710 and bottom right segment 716 corresponds to the Grey segment in screen 710.

Once all of the segments of the image 724 have been displayed by the mobile communicator 704 and read by the POS 708, a full image 724 is present at the POS 708 and may represent complete transmission of transactional information enabling a transaction to be carried out.

Mobile communicator 704 preferably includes sequential visually sensible indicia generation functionality operative to generate a sequence of particular indicia on display screen 702, which sequence together provides at least transaction data. A preferred embodiment of sequential visually sensible indicia generation functionality is described hereinbelow with reference to FIG. 10.

POS 708 preferably includes sequential visually sensible indicia receiving functionality and transaction data extraction functionality operative to extract at least transaction data from the sequence received. A preferred embodiment of sequential visually sensible indicia receiving functionality and transaction data extraction functionality is described hereinbelow with reference to FIG. 11. As seen in FIG. 3B, POS 708 is operative to communicate at least a portion of the information extracted, including at least payment card data, to a financial processor 740, to complete a transaction between the user of the handheld device and the merchant.

Reference is now made to FIG. 4, in which it is seen that bi-directional communication is provided using both a camera 810 on a POS 812 which views the screen 814 of a mobile communicator 816 and a camera 820 on mobile communicator 816, which views a screen 822 on POS 812. Camera 820 enables receipt of a sequence of time based visually sensitive indicia, preferably transmitted from POS 812. A software application on mobile communicator 816 enables extraction of the information in the sequence of time based visually sensitive indicia transmitted by the POS 812. This receiving capability is especially useful in PIN entry transactions wherein the POS 812 transmits a command to enter the PIN on the mobile communicator 816.

It is appreciated that in the embodiment of FIG. 4, both mobile communicator 816 and POS 812 preferably include appropriate sequential visually sensible indicia generation functionality and appropriate sequential visually sensible indicia receiving functionality.

Additionally, POS 812 preferably includes transaction data extraction functionality operative to extract transaction data from the sequence received. As seen in FIG. 4, POS 812 is operative to communicate at least a portion of the information extracted, including at least payment card data, to a financial processor 830, to complete a transaction between the user of the handheld device and the merchant.

Figure 5A:
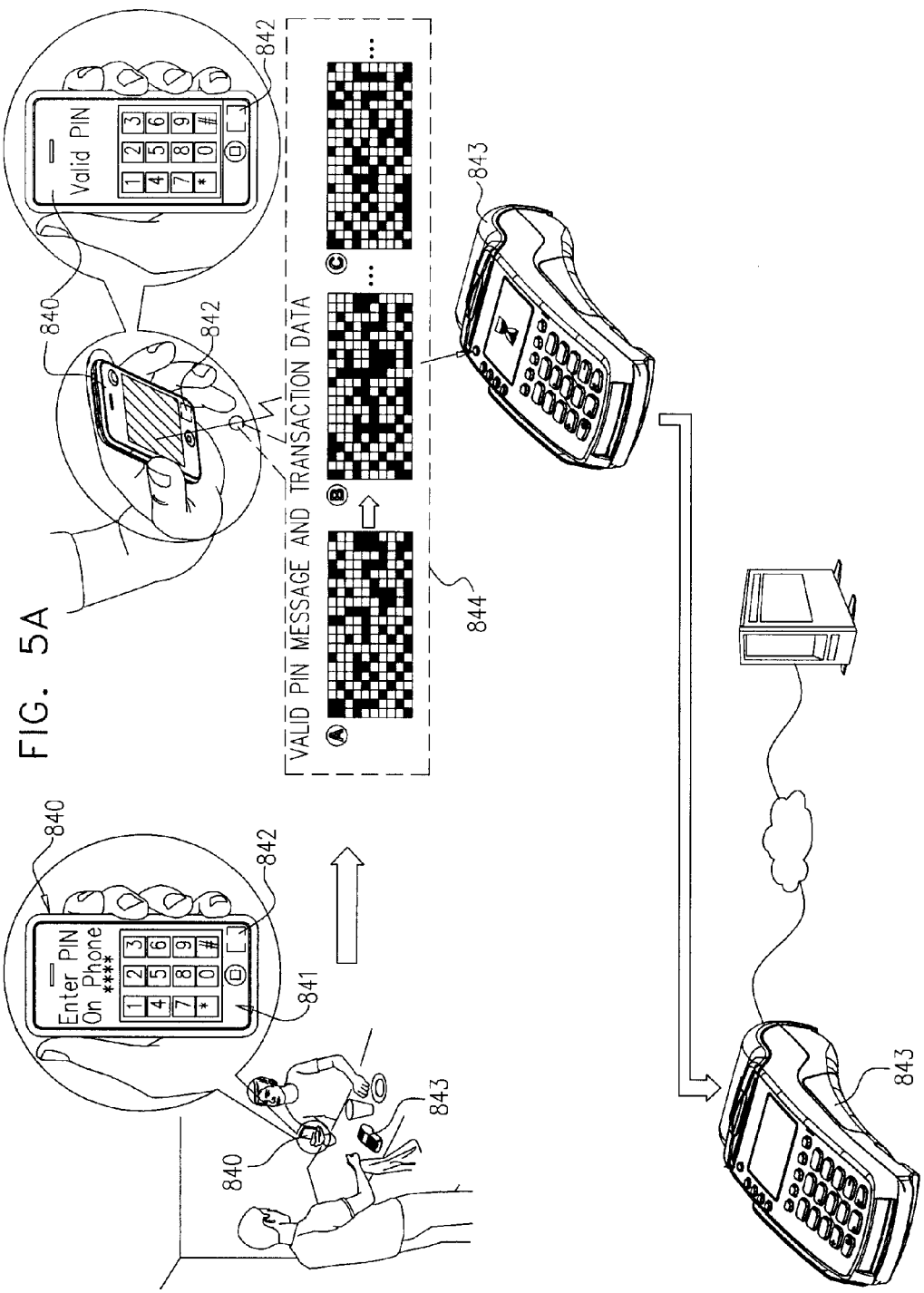

Reference is now made to FIGS. 5A and 5B, which illustrate functionality of the present invention which employs secure PIN numbers. Such PIN numbers are conventionally required in various types of transactions, such as debit card and bank card transactions.

As seen in FIG. 5A, a purchaser paying for his purchase using his mobile communicator 840 is prompted to enter his PIN using a keypad 841 of his mobile communicator 840. Secure circuitry 842 in the mobile communicator 840 verifies the authenticity of the PIN and then securely sends a VALID PIN ENTERED message to a suitably equipped POS 843. Preferably, but not necessarily, the VALID PIN ENTERED message is communicated by means of a time sequence of visually sensible indicia shown at reference numeral 844, together with other transaction data. The POS 843 then proceeds to effect the transaction in accordance with conventional transaction protocols.

As seen in FIG. 5B, a purchaser paying for his purchase using his mobile communicator 845 is prompted to enter his PIN using a keypad 846 of a POS 847. Secure circuitry 848 in the POS 847 verifies the authenticity of the PIN and then displays a VALID PIN ENTERED message. Preferably, but not necessarily, the transaction data is communicated by means of a time sequence of visually sensible indicia shown at reference numeral 849. The POS 847 then proceeds to effect the transaction in accordance with conventional transaction protocols.

Reference is now made to FIG. 6, in which it is seen that bi-directional communication is provided using both a camera 850 on a mobile communicator 852 which views the screen 854 of a mobile communicator 856 and a camera 860 on mobile communicator 856, which views a screen 862 on mobile communicator 852. Camera 860 enables receipt of a sequence of time based visually sensitive indicia, preferably transmitted from mobile communicator 852.

A software application on mobile communicator 856 enables extraction of the information in the sequence of time based visually sensitive indicia transmitted by the mobile communicator 852. Similarly camera 850 enables receipt of a sequence of time based visually sensitive indicia, preferably transmitted from mobile communicator 856. A software application on mobile communicator 852 enables extraction of the information in the sequence of time based visually sensitive indicia transmitted by the mobile communicator 856.

The functionality of FIG. 6 enables payment transactions to be carried out by two suitably equipped mobile communicators without involving a POS.

Mobile communicators 852 and 856 preferably both include appropriate sequential visually sensible indicia generation functionality, operative to generate a sequence of particular indicia on respective display screens 862 and 854, which sequence together provides transaction data, and appropriate sequential visually sensible indicia receiving functionality and transaction data extraction functionality, operative to extract at least payment data from the sequence received.

A preferred embodiment of sequential visually sensible indicia generation functionality is described hereinbelow with reference to FIG. 10. A preferred embodiment of sequential visually sensible indicia receiving functionality and transaction data extraction functionality is described hereinbelow with reference to FIG. 11.

As seen in FIG. 6, at least one, and preferably both of mobile communicators 852 and 856 is optionally operative to communicate at least a portion of the transaction information extracted, including at least payment card data, to a financial processor 870, to complete a transaction between the users of the mobile communicators 852 and 856.

A number of operational features are applicable to one or more of the various embodiments described hereinabove.

It is appreciated that any suitable combination of patterns and color may be employed. When colors, for example 256 different colors, each representing a different ASCII code character, are employed, suitable color calibration of the POS vis-à-vis the mobile communicator, whose image is being read, may be necessary.

It is also appreciated that a camera associated with the point of sale terminal may be operative all the time, at a relatively low duty cycle. Upon activation of the application at the mobile communicator, a trigger signal of known shape may be generated at the screen continuously for a predetermined time duration (preferably 0.5 sec). A trigger signal may be a star, or other shape, that would not likely be seen by the camera otherwise. When the camera detects the trigger signal it starts recording at a higher rate, to receive the sequence of visually sensible indicia generated by the mobile communicator.

It is further appreciated that the use of a time sequence of visually sensible indicia, particularly a combination of colors and patterns, is believed to be more secure than the use of a single monochromatic 2D array since it is more difficult to capture and intercept by a person having unauthorized temporary custody of a mobile communicator.

With reference to embodiments in which various colors are displayed, it is appreciated that the maximal communication rate depends, inter alia, on the recovery rate of the mobile communicator screen—i.e. how fast colors can be changed. Conventional cameras which can be incorporated into a POS may capture an image every 4 ms.

It is further appreciated that more than a single payment card may be emulated by a given mobile communicator.

It is also appreciated that when a user wishes to pay with his hand held device, such as his mobile communicator, he may take out his communicator, actuate the payment application, select a card that he wants to use from the choices presented on the screen of the communicator by the application and thereafter place the communicator in front of the camera. As shown in FIGS. 2A and 2B, a cradle may be used to enable the user to place the mobile communicator firmly in front of the camera, such that the camera will see the entire screen of the mobile communicator.

Additional security may be provided by a sight-limiting screen or enclosure placed around the camera and the mobile communicator to prevent the images from being viewed by another camera or by a Fresnel lens associated with the camera so that the communicator can be held directly against the lens.

It is further appreciated that the communications methods and elements described hereinabove for the communication of information from the mobile communicator to the POS device may also be used to communicate from the screen of a POS device to the mobile communicator using a video camera which may be incorporated in mobile phones, smart phones and other mobile communicators. The ability to communicate from the mobile communicator to the POS device and vice-versa enables "hand shaking" and other security functions, including those required under the Near Field Communication standards and EMV standards.

The mobile communicator used in the embodiments of the present invention described herein may also include a tamper resistant security module for storing confidential information involved in transactions such as those described hereinabove with reference to FIGS. 1A-6. The security module may be any secure element in the mobile communicator. Examples of secure elements are the "SIM" card of a GSM mobile phone or smart device, or an embedded or detachable memory element. The data stored in the security module cannot easily be accessed by any software or persons or systems except with the knowledge and consent of the customer, who is the user of the device.

An operating system of the security module may include functionality to ensure that the information contained in the tamper resistant security module remains secure except when accessed with knowledge of the customer. The operating system may directly control access by the customer, for example, by requiring the customer to enter a PIN number before the data is accessed, and then controlling the data as it is converted into the time based visually sensible indicia image sequence presented on the screen, so that such data cannot be obtained by any software or persons or systems except with the knowledge and consent of the customer, who is the authorized user of the device.

The mobile communicator may include an application that accesses the customer's bank account to download spending information from the account to the device, so that the customer is aware, for example, of how much has been spent on each bank or credit account.

In addition, the mobile communicator may have encryption functionality operative to encrypt a portion of the transaction data before it is transmitted to the POS device.

In addition, the mobile communicator and/or the POS may have a coupon management application, that receives and stores "coupons" to be used as credits in the purchase process. The coupons may be stored within the mobile communicator. When executing a purchase using one or more coupons, the coupons are translated into the time based visually sensible indicia image sequences presented on the screen, captured by the POS camera and deducted from the total purchase amount at the merchant. The coupon application may also include functionality to automatically delete the coupon after the corresponding sequence of time based visually sensible indicia images has been presented on the screen, and/or functionality to delete the coupon after its use upon receipt of a signal from an external system. It is appreciated that information relating to coupons may form part of the transaction data communicated in accordance with a preferred embodiment of the present invention as discussed hereinabove with reference to FIGS. 1A-6.

The POS device may also include functionality operative to process coupon information, such a reduction in purchase price, received from the mobile communicator.

The POS device may also include functionality operative to provide a used coupon notification signal, upon use of a coupon, to the system that issued/originated the coupon, so that such system knows that the coupon has been used. This information may be used by the coupon issuing system to generate reports on the effectiveness of advertising or other activity that caused the customer to accept, or a system to deliver, the coupon.

In addition, the sequence of time based visually sensible indicia images may include personal information, such as name, age, gender, income, area of residence, and other important personal traits, that can be used by the merchant to improve service, provide better selection of goods, or for the merchant or other entities to provide more relevant information, such as content at the store display screens, or advertising that the customer may view.

In addition, the camera or the POS may include functionality operative to encrypt the received data immediately after it is converted from the sequence of time based visually sensible indicia so that the information cannot be intercepted.

In addition, the camera module may be connected to the POS by means of data circuitry such as Peripheral Component Interconnect (PCI) or serial ports. This circuitry may or may not have secure elements such that the transaction information received thereby cannot be obtained by another device or person.

The POS device may also include decryption functionality operative to decrypt the information encrypted by the camera module.

The POS device may also include additional functionality for processing other information, such as personal information, transmitted from the mobile communicator, so as to communicate that information to other systems.

The camera and POS device may be employed in transportation systems, such as taxis, buses, trains or airplanes.

The camera attached to the POS device may also be employed to ascertain additional information about the customer. For example, using software that is generally available, the camera may be used to determine how many customers there are and their personal information. Such information may be used to improve service, provide better selection of goods, or for the merchant or other entities to provide more relevant information, such as content on display screens, or advertising that the customer may view. It may also be used by transportation systems, for example to count passengers.

Reference is now made to FIG. 7, which illustrates use of a dynamic card to interface between a personal device and a POS. This embodiment is particularly useful with a POS which is not equipped with a camera and lacks functionality for communicating a time sequence of visually sensible indicia with a mobile communicator but does have a magnetic stripe reader.

In the embodiment of FIG. 7, a dynamic card 900, such as a suitably modified device commercially available from Privasys of Newbury Park, Calif., dynamically generates a magnetic stripe 902. The dynamic card 900 communicates with a customer's mobile communicator 904, receives a time sequence of visually sensible indicia, as indicated at A, B and C, similarly to the sequence described hereinabove with reference to FIG. 1A, reconstructs the information contained therein, extracts at least the card data and dynamically places it on the magnetic stripe.

The dynamic card 900 incorporates a camera 906 as well as circuitry and software for receiving the sequence of visually sensible images, reconstructing transaction data communicated thereby, including at least the card data, and temporarily expressing that information in the magnetic stripe 902.

A Fresnel lens 908 may be located in front of camera 906 on the dynamic card 900 thereby enabling the dynamic card 900 to be placed in close proximity to and facing the screen of the customer's mobile communicator 904 while camera 906 reads the time sequence of visually sensible indicia displayed on the customer's mobile communicator 904.

The dynamic card 900 may also incorporate functionality for Near Field Communication and/or other suitable wireless communication with the mobile communicator 904.

The transmission of transaction data, such as credit card data, from the mobile communicator 904 to the dynamic card 900 may be encrypted, and the dynamic card 900 may have functionality for decrypting the transaction data.

The dynamic card 900 need not hold transaction data for any significant amount of time, but just long enough to complete the transaction. Thereafter the transaction data may be deleted from the dynamic card 900. In this way, the card like device 900 can represent any card that the consumer has stored on the mobile communicator.

When a customer wishes to use his mobile communicator 904, with a POS 910 having magnetic stripe reader capability, but no means of communicating with the mobile communicator directly, the mobile communicator 904 preferably transmits a time sequence of visually sensible indicia to the dynamic card 900, which dynamically places the customer card information on its magnetic stripe 902. The dynamic card 900 may be swiped at the POS 910 just like any conventional credit or debit card. Accordingly, transaction data may be stored in the mobile communicator 904 and be only communicated to the dynamic card 900 just before swiping the dynamic card 900 at POS 910, after which the transaction data may be erased from the dynamic card 900.

As seen in FIG. 7, POS 910 is operative to communicate with a financial processor 920 in a conventional manner to complete a transaction between the user of the handheld device and the merchant.

Figure 8A:
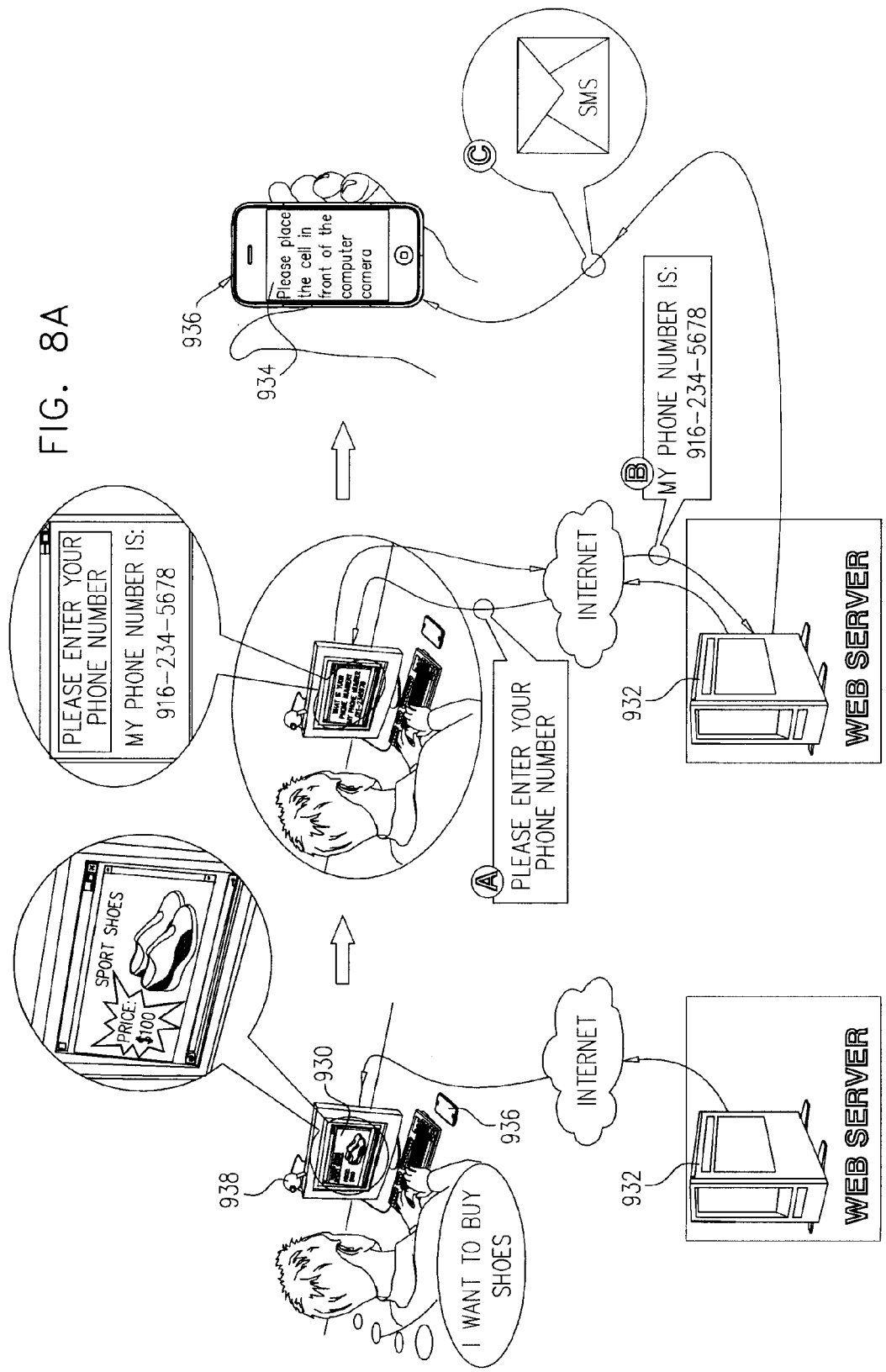

Reference is now made to FIGS. 8A and 8B, which together illustrate functionality for on-line payments, in accordance with an embodiment of the present invention, employing a customer's mobile communicator.

As seen in FIGS. 8A and 8B, in accordance with this embodiment of the invention when the customer orders a pair of shoes on line, i.e. via the web, using his home computer 930, a web server 932 of the on-line merchant requests entry of the customer's mobile phone number.

Upon receipt of the customer's mobile phone number, the web server of the on line merchant sends an SMS to the customer, requesting that the customer place the display screen 934 of his mobile communicator 936 in front of the customer's web cam 938 and display a time sequence 939 of visually sensible indicia. When the customer does this and the sequence is received at the web server 932 of the on-line merchant, the transaction is completed.

Alternatively, if the customer's mobile communicator equipped with a card reader, such as a VERIFONE® PAY-WARE® mobile device, upon receipt of the customer's mobile phone number, the web server 932 of the on-line merchant sends a signal to the customer's mobile communicator 936, and the customer swipes his credit card (not shown). As a further alternative or in addition, the customer may sign on a touch screen of the mobile communicator 936 and this signature may be transmitted to the web server 932 of the on-line merchant.

The mobile communicator 936 may have a secure key pad (not shown). In such a case, the customer may be prompted to enter a PIN number, enabling the transaction to be a debit-card transaction.

The various embodiments described hereinabove with reference to FIGS. 8A & 8B may be considered to provide a card-present on-line transaction.

Reference is now made to FIG. 9, which illustrates functionality for on-line payments in accordance with another embodiment of the present invention. The embodiment of FIG. 9 provides a simplified payment and checkout process for online payments, employing a time sequence of two-dimensional arrays.

As seen in FIG. 9, a customer wishing to make a purchase on-line is prompted to place his mobile communicator 940 in a cradle 942 associated with a POS 944 such that a camera 946 of the mobile communicator 940 views a display screen 948 of the POS 944. The POS transmits a time sequence of two-dimensional arrays to the mobile communicator 940, which is used by the mobile communicator 940 to set up a secure wireless communication link with either or both the POS 944 and a secure payment server 950.

Once the secure wireless communication link has been set up, the wireless communicator 940 transmits full credit card data along the secure wireless communication link either directly or via POS 944 to the secure payment server 950 and the transaction is completed. The secure wireless communication links may be short range links, such as NFC and BLUETOOTH® or longer range links such as WIFI or GPRS.

It is appreciated that the embodiments shown hereinabove, and particularly the embodiments shown in FIGS. 8A-9, preferably provide a secure wireless communication link which enables a "card-present" transaction to be processed. It is further appreciated that a portion of the savings from "card-present" transactions could be passed onto the consumer in the form of coupons for other purchases.

Figure 10:
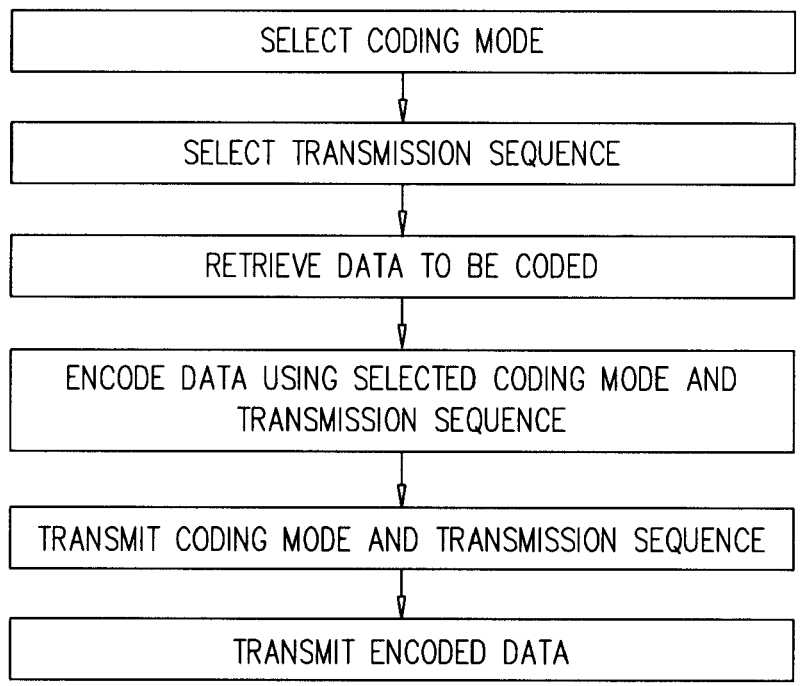
FIG. 10 is a simplified flow chart illustrating an implementation of sequential visually sensible indicia generation functionality of the present invention.

Reference is now made to FIG. 10, which is a simplified flow chart illustrating one implementation of the sequential visually sensible indicia generation functionality of the present invention.

As seen in FIG. 10, the sequential visually sensible indicia generation functionality preferably comprises the following steps:

Selecting a coding mode, such as a Morse type code as described hereinabove with reference to FIGS. 1A-1C or an ASCII code as described hereinabove with reference to FIG. 1D;

Selecting a transmission sequence, such as entire array in one screen as described in FIGS. 1A-1D, by quadrant as in FIG. 3B or one character at a time as described in FIG. 3A;

Retrieving data to be coded, such as credit card information or personal information;

Encoding the data using the selected coding mode and transmission sequence;

Transmitting the selected coding mode and transmission sequence information; and Transmitting the encoded data.

It is appreciated that the coding mode and transmission sequence may be selected from available coding modes and transmission sequences based on any suitable method, including, but not limited to, randomly or based on user input.

It is further appreciated that the available coding modes and transmission sequences must be available in both the transmitting device and the receiving device and that, in the event the receiving device does not recognize the selected coding mode and/or selected transmission sequence, the receiving device is operative to notify the transmitting device to select a different coding mode and/or transmission sequence.

Figure 11:
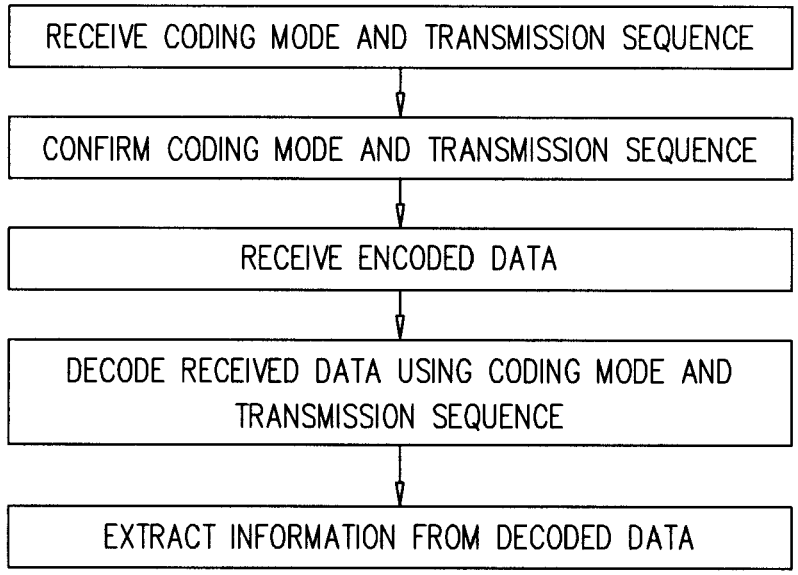
FIG. 11 is a simplified flow chart illustrating an implementation of sequential visually sensible indicia receiving functionality and transaction data extraction functionality of the present invention.

Reference is now made to FIG. 11, which is a simplified flow chart illustrating one implementation of the sequential visually sensible indicia receiving functionality and transaction data extraction functionality of the present invention.

As seen in FIG. 11, the sequential visually sensible indicia receiving functionality and transaction data extraction functionality preferably comprises the following steps:

Receiving the coding mode and transmission sequence information;

Confirming that the coding mode and transmission sequence are valid;

Receiving the encoded data;

Decoding the received data using the coding mode and transmission sequence; and

Extracting the information from the decoded data, such as credit card info or personal info.

It is appreciated that the extraction of information from the decoded data transmitted is preferably based on standard information extraction methods used in conventional POS transactions.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A point of sale transaction system comprising:
a plurality of mobile communication devices having sequential time based visually sensible indicia generation functionality, said sequential time based visually sensible indicia generation functionality being capable of generating a time sequence of indicia, said time sequence of indicia including a time sequence of two-dimensional arrays containing n columns and m rows of pixels at a plurality of times, designated t1, t2, t3 . . . tu, which time sequence of two-dimensional arrays containing n columns and m rows of pixels provides at least one of payment card data and coupon data, said time sequence of two-dimensional arrays being characterized in that:
 a first time sequence of pixels, at times t1, t2, t3 . . . tu, appearing at a first single pixel location (i,j) of a two-dimensional n×m array in said time sequence of two-dimensional arrays represents a first single alpha-numeric character, which is either a single digit number or a single Latin character; and
 a second time sequence of pixels, at times t1, t2, t3 . . . tu, appearing at a second single pixel location (c,q) of said two-dimensional n×m array in said time sequence of two-dimensional arrays represents a second single alpha-numeric character, which is either a single digit number or a single Latin character; and
a point of sale terminal having a sequential time based visually sensible indicia receiving functionality and transaction data extraction functionality capable of extracting said at least one of payment card data and coupon data from a particular time sequence of indicia.

2. A point of sale transaction system according to claim 1 and wherein said time sequence of indicia are video images.

3. A point of sale transaction system according to claim 1 and wherein at least some of said indicia are in different colors.

4. A point of sale transaction system according to claim 1 and wherein said particular time sequence of indicia comprises a multiplicity of visually sensible indicia generated in a particular time sequenced order.

5. A point of sale transaction system according to claim 1 and wherein said particular time sequence of indicia comprises a multiplicity of visually sensible indicia which are generated each time in a different particular order.

6. A point of sale transaction system according to claim 1 wherein:
said point of sale terminal also includes sequential time based visually sensible indicia generation functionality, said time based visually sensible indicia generation functionality of said point of sale terminal being capable of generating a particular time sequence of particular indicia, said particular time sequence of particular indicia including a time sequence of two-dimensional arrays of pixels which time sequence of two-dimensional arrays of pixels provides at least one of payment card handshaking and security confirmation data and coupon acceptance data; and
said plurality of mobile communication devices also include:
 video cameras capable of assimilating sequential time based visually sensible indicia generated by said sequential time based visually sensible indicia generation functionality of said point of sale terminal and by said sequential time based visually sensible indicia generation functionality of said plurality of mobile communication devices;
 sequential time based visually sensible indicia receiving functionality; and
 transaction data extraction functionality capable of extracting said at least one of payment card handshaking and security confirmation data and coupon acceptance data from said particular time sequence of particular indicia.

7. A transaction system according to claim 6 and wherein said particular time sequence of particular indicia comprises a multiplicity of visually sensible indicia which are generated each time in a different order.

8. A point of sale transaction system according to claim 6 and wherein said particular time sequence of particular indicia are video images.

9. A point of sale transaction system according to claim 6 and wherein at least some of said indicia are in different colors.

10. A point of sale transaction system according to claim 6 and wherein said particular time sequence of particular indicia comprises a multiplicity of visually sensible indicia generated in a particular time sequenced order.

11. A point of sale transaction system according to claim 6 and wherein said particular time sequence of particular indicia comprises a multiplicity of visually sensible indicia which are generated each time in a different particular order.

12. A transaction system according to claim 4 and wherein said time sequence of indicia comprises a multiplicity of visually sensible indicia which are generated each time in a different order.

13. A transaction system according to claim 5 and wherein said time sequence of indicia comprises a multiplicity of visually sensible indicia which are generated each time in a different order.

14. A transaction system according to claim 1 and wherein said time sequence of indicia comprises a multiplicity of visually sensible indicia which are generated each time in a different order.

15. A method for communicating at least one of payment card data and coupon data from a mobile communications device to a point of sale terminal, the method comprising:

generating at said mobile communications device a time sequence of indicia, said time sequence of indicia including a time sequence of two-dimensional arrays containing n columns and m rows of pixels at a plurality of times designated t1, t2, t3 ... tu, which time sequence of two-dimensional arrays of pixels provides at least one of payment card data and coupon data, said time sequence of two-dimensional arrays being characterized in that:
- a first time sequence of pixels, at times t1, t2, t3 ... tu, appearing at a first single pixel location (i,j) of a two-dimensional n×m array in said time sequence of two-dimensional arrays represents a first single alpha-numeric character, which is either a single digit number or a single Latin character; and
- a second time sequence of pixels, at times t1, t2, t3 ... tu, appearing at a second single pixel location (c,q) of said two-dimensional n×m array in said time sequence of two-dimensional arrays represents a second single alpha-numeric character, which is either a single digit number or a single Latin character;

displaying to said point of sale terminal said time sequence of indicia including said time sequence of two-dimensional arrays containing n columns and m rows of pixels at said plurality of times, designated t1, t2, t3 ... tu, which time sequence of two-dimensional arrays of pixels provides at least one of payment card data and coupon data;

receiving said time sequence of two-dimensional arrays at said point of sale terminal; and decoding said time sequence of two-dimensional arrays received by said point of sale terminal, thereby to construct a string of digits of alphanumeric data wherein:
- a first alphanumeric character of said string of digits of alphanumeric data is decoded from said first time sequence of pixels at times t1, t2, t3 ... tu appearing at said first single pixel location (i,j) in said time sequence of two-dimensional arrays representing a first single alpha-numeric character, which is either a single digit number or a single Latin character; and
- a second alphanumeric character of said string of digits of alphanumeric data is decoded from said second time sequence of pixels at times t1, t2, t3 ... tu appearing at said second single pixel location (c,q) in said time sequence of two-dimensional arrays representing a second single alpha-numeric character, which is either a single digit number or a single Latin character.

* * * * *